(12) United States Patent
Ishikawa

(10) Patent No.: US 8,804,834 B2
(45) Date of Patent: Aug. 12, 2014

(54) IMAGE PROCESSING APPARATUS, IMAGE PROCESSING METHOD AND IMAGE PROCESSING PROGRAM

(75) Inventor: Takanori Ishikawa, Saitama (JP)

(73) Assignee: Sony Corporation, Tokyo (JP)

( * ) Notice: Subject to any disclaimer, the term of this patent is extended or adjusted under 35 U.S.C. 154(b) by 856 days.

(21) Appl. No.: 12/979,809

(22) Filed: Dec. 28, 2010

(65) Prior Publication Data

US 2011/0170600 A1     Jul. 14, 2011

(30) Foreign Application Priority Data

Jan. 8, 2010  (JP) ................. 2010-003077

(51) Int. Cl.
*H04N 7/12* (2006.01)
*H04N 7/50* (2006.01)
*H04N 7/26* (2006.01)
*H04N 7/46* (2006.01)

(52) U.S. Cl.
CPC ............. *H04N 7/50* (2013.01); *H04N 7/26244* (2013.01); *H04N 7/462* (2013.01)
USPC ............ 375/240.16; 375/240.15; 375/240.12; 375/240.14; 382/236; 382/238

(58) Field of Classification Search
CPC ...... H04N 7/50; H04N 7/26244; H04N 7/462
USPC ............. 375/240.16, 240.15, 240.12, 240.14; 382/236, 238
See application file for complete search history.

(56) References Cited

U.S. PATENT DOCUMENTS

| 5,754,226 A | * | 5/1998 | Yamada et al. | ............ 348/219.1 |
| 2008/0019447 A1 | * | 1/2008 | Kondo et al. | ............ 375/240.16 |
| 2010/0080299 A1 | * | 4/2010 | Takeda et al. | ............ 375/240.16 |

FOREIGN PATENT DOCUMENTS

| JP | 2005-175869 A | 6/2005 |
| JP | 2005-175870 A | 6/2005 |

* cited by examiner

*Primary Examiner* — Shawn An
(74) *Attorney, Agent, or Firm* — Wolf, Greenfield & Sacks, P.C.

(57) ABSTRACT

Disclosed herein is an image processing apparatus, including: a representative-point storing section; an evaluation-value table generation section; a peak detection section; and a correlation determination section, wherein an operation carried out by the evaluation-value table generation section to generate the evaluation-value table on the basis of representative points stored in the representative-point storing section, an operation carried out by the peak detection section to detect the candidate vector, an operation carried out by the correlation determination section to determine the correlation between the representative point and the referenced point as well as an operation carried out by the correlation determination section to update the representative-point storing section in accordance with a result of the operation to determine a correlation between the representative point and the referenced point are repeated as long as existence of a significant candidate vector is determined.

7 Claims, 19 Drawing Sheets

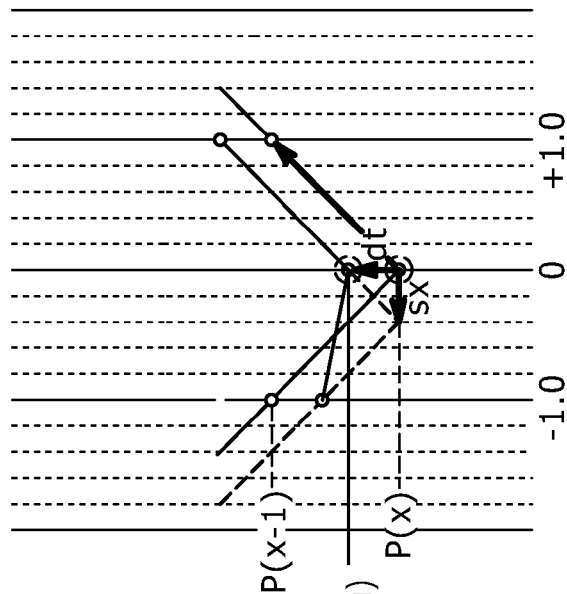
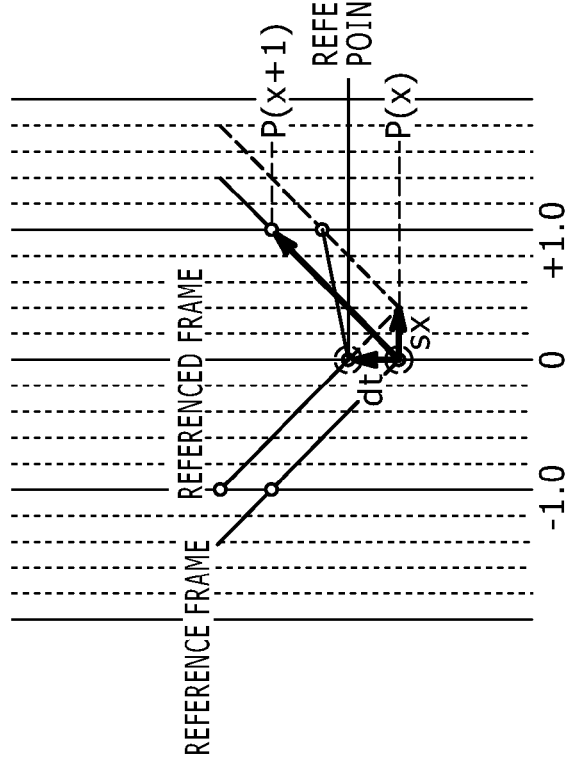

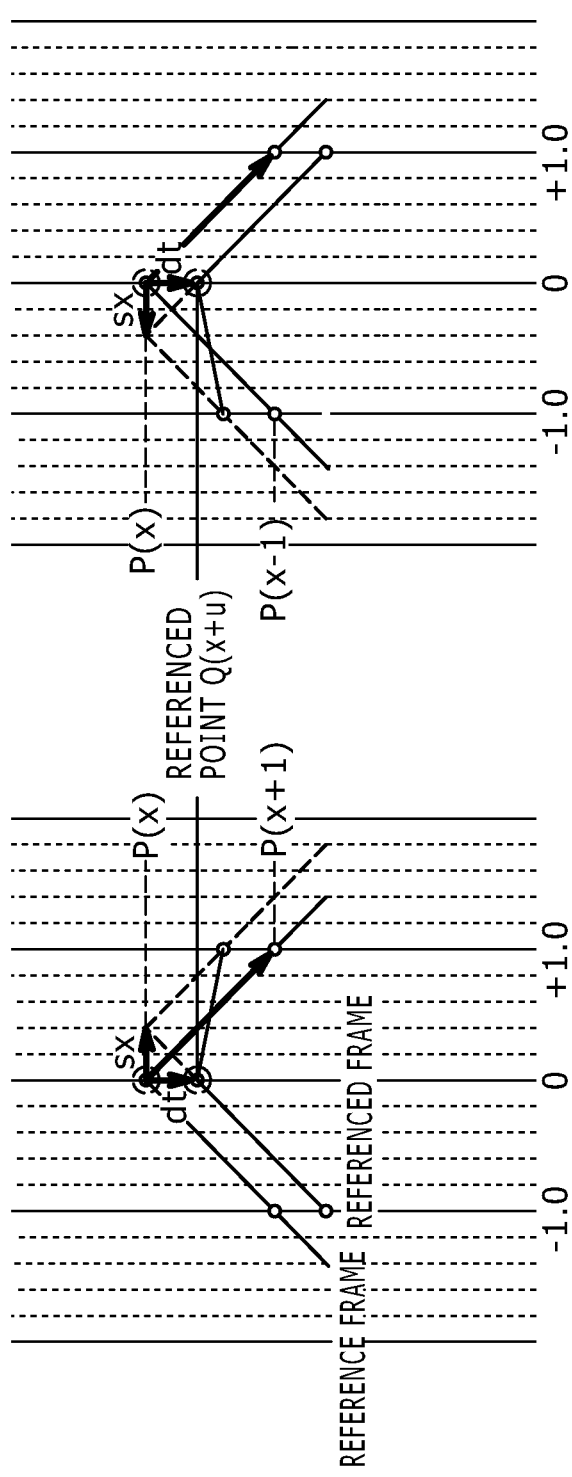

FIG.15

| HORIZONTAL DIRECTION | SHORTER-THAN-1-PIXEL SHIFT: PLUS DIRECTION | | SHORTER-THAN-1-PIXEL SHIFT: MINUS DIRECTION | |
|---|---|---|---|---|
| WAVEFORM SHAPE | FIRST EVALUATION-FUNCTION COMPUTATION SECTION | SECOND EVALUATION-FUNCTION COMPUTATION SECTION | THIRD EVALUATION-FUNCTION COMPUTATION SECTION | FOURTH EVALUATION-FUNCTION COMPUTATION SECTION |
| RIGHTWARD INCREASING | F1=(P(x)≧Q(x+u))-th && P(x)≦Q(x+u+1)+th)? 1:0 | F2=(Q(x+u)≧P(x-1))-th && Q(x+u)≦P(x)+th)? 1:0 | F3=(P(x)≧Q(x+u-1))-th && P(x)≦Q(x+u)+th)? 1:0 | F4=(Q(x+u)≧P(x))-th && Q(x+u)≦P(x+1)+th)? 1:0 |
| RIGHTWARD DECREASING | F1=(P(x)≧Q(x+u+1))-th && P(x)≦Q(x+u)+th)? 1:0 | F2=(Q(x+u)≧P(x))-th && Q(x+u)≦P(x-1)+th)? 1:0 | F3=(P(x)≧Q(x+u))-th && P(x)≦Q(x+u-1)+th)? 1:0 | F4=(Q(x+u)≧P(x+1))-th && Q(x+u)≦P(x)+th)? 1:0 |
| DOWNWARD PROTRUSION | | F2=(Q(x+u)≧P(x+1))-th && Q(x+u)≦P(x-1)+th)? 1:0 | | F4=(Q(x+u)≧P(x-1))-th && Q(x+u)≦P(x+1)+th)? 1:0 |
| UPWARD PROTRUSION | | F2=(Q(x+u)≦P(x+1))-th && Q(x+u)≧P(x-1)+th)? 1:0 | | F4=(Q(x+u)≦P(x-1))-th && Q(x+u)≧P(x+1)+th)? 1:0 |

IMAGE PROCESSING APPARATUS, IMAGE PROCESSING METHOD AND IMAGE PROCESSING PROGRAM

BACKGROUND OF THE INVENTION

1. Field of the Invention

The present invention relates to an image processing apparatus, an image processing method and an image processing program. More particularly, the present invention relates to an image processing apparatus capable of improving the precision of an operation carried out thereby to detect a motion vector by improving the precision of candidate vectors to be extracted, an image processing method to be adopted by the apparatus and an image processing program implementing the method.

2. Description of the Related Art

With recent progress of signal processing carried out on a moving image, a technology for detection of a motion vector of every object on an image is applied to a variety of fields. For example, the technology for detection of a motion vector of every object on an image is used in movement-compensation type encoding carried out as high-performance encoding, frame-rate conversion of a moving image, processing to detect a moving object in a traffic monitoring system, movement detection processing, etc. A technology for detecting a disparity vector from images appearing at a plurality of points is applied to detection of a moving object from images taken by making use of stereo cameras, depth measurements, etc. Detection of a motion vector of a moving image and detection of a disparity vector of each of images appearing at a plurality of points are different from each other only in that the detections merely have different relations between images used for establishing association. From the technological point of view, the detection of a motion vector of a moving image is same with the detection of a disparity vector of each of images appearing at a plurality of points. For this reason, the detection of a motion vector of a moving image and the detection of a disparity vector of each of images appearing at a plurality of points are both referred to as vector detection.

In the past, a block matching technique is widely adopted in the vector detection. In accordance with the block matching technique, an overall search operation is carried out in order to compare all pieces of data in a search area. Thus, the block matching technique has a demerit that the number of comparisons to be carried out in the comparison of all pieces of data in a search area is large and, thus, the long time is required to perform the vector detection.

In addition, if a block includes a plurality of portions with different movement directions, a movement detected with the block taken as a unit representing individual movements in the block cannot be said to be a movement detected with a high degree of accuracy. Such a problem can be solved by setting the size of the block at a properly adjusted value. If the size of the block is set at an excessively large value, the amount of computation increases. In addition, with the size of the block set at an excessively large value, a problem caused by a plurality of movements in the block is tend to be raised. If the size of the block is set at an excessively small value so as to prevent the block from including a plurality of movements, the size of an area used for determination of a matching state decreases. Thus, in this case, there is raised a problem that the precision of the movement detection deteriorates.

In order to solve the problems described above, inventor of the present invention has proposed a motion-vector detection apparatus capable of detecting a motion vector for every pixel without increasing the amount of computation and capable of avoiding incorrect motion-vector detection and a motion-vector detection method to be adopted by the motion-vector detection apparatus described in Japanese Patent Laid-open Nos. 2005-175869 (as Patent Document 1) and 2005-175870 (as Paten Document 2).

In accordance with points described in Patent Documents 1 and 2 as points of the motion-vector detection method, an evaluation value is computed for every pixel or every block of pixels. In this case, however, a motion vector is not determined directly. Instead, the problems raised in the past are solved by adoption of a candidate-vector method. In accordance with the candidate-vector method, first of all, as a first step, an evaluation-value table is generated for an image by adoption of a representative-point matching technique and some candidate vectors are extracted from the generated evaluation-value table. Then, as a second step, for every pixel, a candidate vector considered to be the best is selected from the candidate vectors. The selected candidate vector is taken as a motion vector. In this way, a motion vector can be decided for every pixel.

In accordance with the candidate-vector method, only effective positions (that is, the positions of candidate vectors) in a search area are extracted at the first step in order to reduce the amount of computation. It is quite within the bounds of probability that, on a boundary of an image taking subject, incorrect vector detection is carried out inadvertently. Also for such a boundary of an image taking subject, a best vector is determined from few candidate vectors which have been determined in advance after the number of candidate vectors has been reduced. Thus, in comparison with an operation to search the entire search area, the probability of resulting in the same evaluation value for different pixels is low and the probability of the incorrect vector detection is also reduced as well.

SUMMARY OF THE INVENTION

In accordance with the motion-vector detection method disclosed in Patent Documents 1 and 2, however, in an operation to extract a candidate vector from every evaluation-value table, it is necessary to set the number of candidate vectors, which are to be extracted from the evaluation-value table, in advance. In consequence, the following problems are raised.

If the number of candidate vectors to be extracted from evaluation-value tables is set at a value greater than the number of significant candidate vectors existing in the image, the probability that the extracted candidate vectors include unnecessary candidate vectors is high. Thus, in processing carried out at the second step to select a vector considered to be the best, the probability of incorrect vector detection increases. Conversely, if the number of candidate vectors to be extracted from evaluation-value tables is set at a small value in order to lower the probability of incorrect vector detection, on the other hand, the probability that the extracted candidate vectors include no necessary candidate vectors is high. Also in this case, it is quite within the bounds of possibility that, in the processing carried out at the second step to select a vector considered to be the best, the probability of incorrect vector detection increases as well.

That is to say, in order to decide the best motion vector, as a prerequisite, the precision of candidate vectors extracted at the first step must be high. Depending on the value at which the number of candidate vectors to be extracted from evaluation-value tables is set, the extracted candidate vectors may include unnecessary candidate vectors or the extracted candidate vectors may not include necessary candidate vectors. That is to say, depending on the value at which the number of candidate vectors to be extracted from evaluation-value tables is set, the precision of the candidate vectors may be poor in some cases.

Addressing the problems described above, the inventor of the present invention has improved the precision of detection of motion vectors by improving the precision of candidate vectors extracted in accordance with the candidate-vector method.

An image processing apparatus according to an embodiment of the present invention employs: representative-point storing means for functioning as storage means used for storing a plurality of pixels each existing on a reference image to serve as a representative point for which a motion vector is to be detected in an operation to detect a motion vector for the representative point representing pixels on the reference image by comparing the reference image with a referenced image; and evaluation-value table generation means for generating an evaluation-value table by adoption of a representative-point matching technique making use of the representative points stored in the representative-point storing means. The image processing apparatus further employs: peak detection means for detecting a position corresponding to a maximum value of evaluation-value sums stored in the evaluation-value table as a candidate vector serving as a candidate for the motion vector; and correlation determination means for determining a correlation between the representative point on the reference image and a point existing at the end of the candidate vector detected for the representative point to serve as a referenced point at which a pixel is located on the referenced image for each of a plurality of aforementioned representative points stored in the representative-point storing means and deleting a representative point having a high correlation from the representative-point storing means in order to update the representative-point storing means. In the image processing apparatus, an operation carried out by the evaluation-value table generation means to generate the evaluation-value table on the basis of representative points stored in the representative-point storing means, an operation carried out by the peak detection means to detect the candidate vector, an operation carried out by the correlation determination means to determine a correlation between the representative point and the referenced point as well as an operation carried out by the correlation determination means to update the representative-point storing means in accordance with a result of the operation to determine a correlation between the representative point and the referenced point are performed repeatedly as long as the existence of a significant candidate vector is determined.

An image processing method according to the embodiment of the present invention is a method for driving an image processing apparatus for carrying out image processing determined in advance. The image processing method includes a step of driving the image processing apparatus repeatedly as long as the existence of a significant candidate vector is determined in order to repeatedly perform: a process of generating an evaluation-value table by adoption of a representative-point matching technique for comparing each of a plurality of pixels each existing on a reference image to serve as a representative point stored in representative-point storing means with a referenced image; a process of detecting a position corresponding to a maximum value of evaluation-value sums stored in the evaluation-value table as a candidate vector serving as a candidate for a motion vector between the reference image and the referenced image; and a process of determining a correlation between the representative point on the reference image and a point existing at the end of the candidate vector detected for the representative point to serve as a referenced point at which a pixel is located on the referenced image for each of a plurality of aforementioned representative points stored in the representative-point storing means and deleting a representative point having a high correlation from the representative-point storing means in order to update the representative-point storing means.

An image processing program according to the embodiment of the present invention is a program to be executed by a computer for carrying out processing including a step to be executed repeatedly as long as the existence of a significant candidate vector is determined in order to repeatedly perform: a process of generating an evaluation-value table by adoption of a representative-point matching technique for comparing each of a plurality of pixels each existing on a reference image to serve as a representative point stored in representative-point storing means with a referenced image; a process of detecting a position corresponding to a maximum value of evaluation-value sums stored in the evaluation-value table as a candidate vector serving as a candidate for a motion vector between the reference image and the referenced image; and a process of determining a correlation between the representative point on the reference image and a point existing at the end of the candidate vector detected for the representative point to serve as a referenced point at which a pixel is located on the referenced image for each of a plurality of aforementioned representative points stored in the representative-point storing means and deleting a representative point having a high correlation from the representative-point storing means in order to update the representative-point storing means.

In the embodiments of the present invention, as long as the existence of a significant candidate vector is determined, the following processing is carried out repeatedly. An evaluation-value table is generated by adoption of a representative-point matching technique for comparing each of a plurality of pixels each stored in representative-point storing means as a representative point on a reference image with a referenced image. Then, a position corresponding to a maximum value of evaluation-value sums stored in the evaluation-value table is detected as a candidate vector serving as a candidate for a motion vector between the reference image and the referenced image. Subsequently, for each of the representative points each stored in the representative-point storing means as a representative point on the reference image, a correlation between the representative point and a point located at the end of the candidate vector corresponding to the representative point to serve as a referenced point at which a pixel is located on the referenced image is determined. Finally, a representative point having a high correlation is deleted from the representative-point storing means in order to update the representative-point storing means.

It is to be noted that the image processing program described above can be provided to the user by downloading the program to the image processing apparatus from a program provider through transmission media or by installing the program in the image processing apparatus from a recording medium used for recording the program in advance.

The image processing apparatus can be an independent apparatus or an internal block included in an apparatus.

In the image processing apparatus, the image processing method and the image processing program according to the aspects of the present invention, the precision of candidate vectors to be extracted is raised in order to increase the precision of an operation to detect a motion vector.

BRIEF DESCRIPTION OF THE DRAWINGS

FIGS. 13A and 13B are explanatory diagrams of details of correlation determination processing for a case in which the type of the waveform pattern has a downward-protrusion shape;

FIGS. 14A and 14B are explanatory diagrams of details of correlation determination processing for a case in which the type of the waveform pattern has an upward-protrusion shape;

FIG. 15 shows a table summarizing equations of horizontal-direction evaluation functions F1 to F4;

DETAILED DESCRIPTION OF THE PREFERRED EMBODIMENTS

[Block Diagram Showing Image Processing Apparatus]

Figure 1:
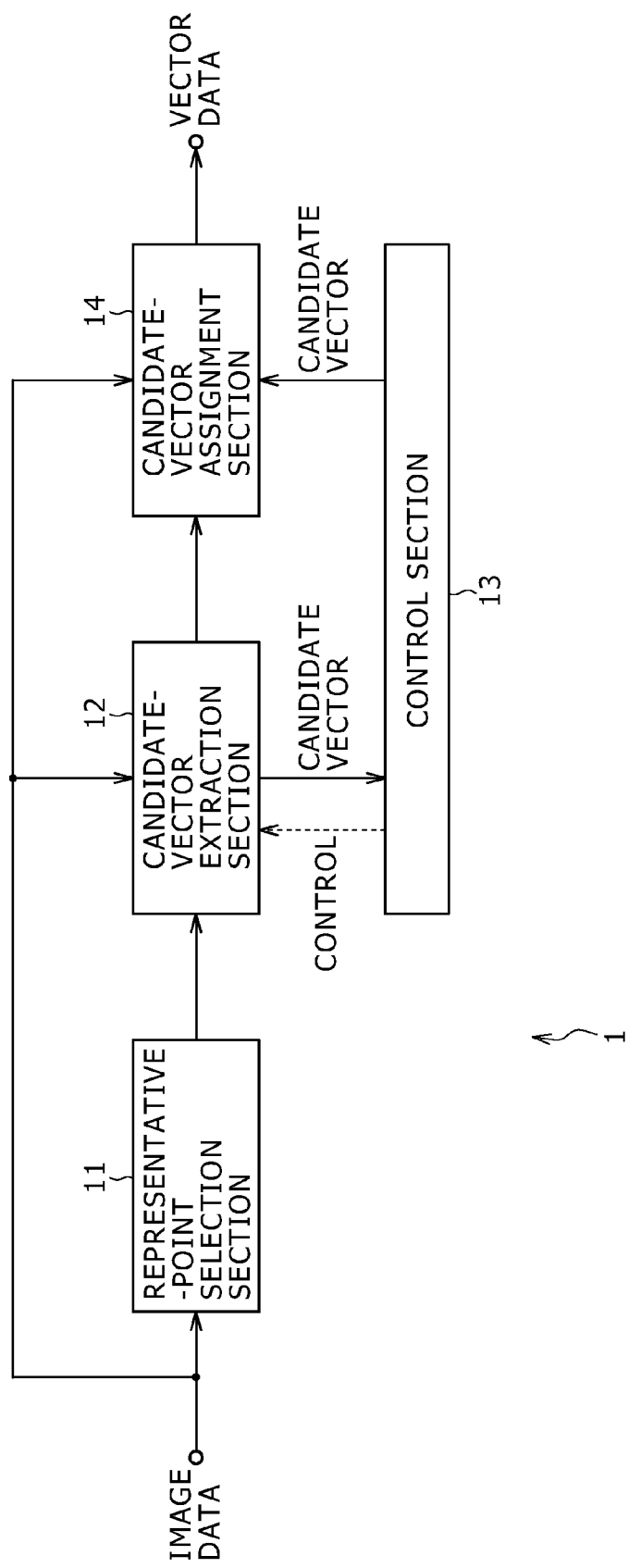
FIG. 1 is a block diagram showing a typical configuration of an embodiment implementing an image processing apparatus to which the present invention is applied.

FIG. 1 is a block diagram showing a typical configuration of an embodiment implementing an image processing apparatus 1 to which the present invention is applied.

As shown in FIG. 1, the image processing apparatus 1 is configured to include a representative-point selection section 11, a candidate-vector extraction section 12, a control section 13 and a candidate-vector assignment section 14.

The image processing apparatus 1 inputs image data representing a plurality of images. The images are typically frame images appearing successively along the time axis to form a moving image or a plurality of frame images taken at different visual points. The input image data is supplied to the representative-point selection section 11, the candidate-vector extraction section 12 and the candidate-vector assignment section 14.

The image processing apparatus 1 takes a specific one of two input frame images determined in advance as a reference frame (reference image) and the other one of the two input frame images determined in advance as a referenced frame (referenced image). The image processing apparatus 1 compares the reference frame to the referenced frame and detects a motion vector of every pixel included in the reference frame. The image processing apparatus 1 outputs the detected motion vectors as vector data. When the image processing apparatus 1 receives three or more input frame images, the image processing apparatus 1 repeatedly carries out processing to detect a motion vector on the sequence of the input frame images. In this case, the image processing apparatus 1 may take a frame image determined in advance as the reference frame. As an alternative, the image processing apparatus 1 can also sequentially select one frame image from the input frame images and take the selected input frame image as the reference frame.

In the following description, input image data is used to imply data of input frame images. It is to be noted, however, that implementations of the present invention are by no means limited to an embodiment in which the input image data is data of input frame images. For example, an implementation of the present invention may also be an embodiment in which the input image data is data of input field images. In addition, the present invention can also be applied to a case in which the input image data is image data based on a TV signal or image data based on a signal other than the TV signal. That is to say, the input image data can be any one of various kinds of image data such as interlaced data or uninterlaced data.

The representative-point selection section 11 decides one or more proper pixels from pixels of an input reference frame and takes each of the decided proper pixels as a representative point. Each of the decided proper pixels will used as a subject, the motion vector of which is to be detected. For example, portions pertaining to a reference frame include a flat portion having the same pixel values which are close to each other. In this case, let a pixel of the flat portion be decided to serve as a representative point. With a pixel of the flat portion decided to serve as a representative point, let a movement be made in the flat portion. Even in the event of such a movement, if the distance of the movement is within the domain of the flat portion, a change caused by the movement cannot be detected. The portions pertaining to a reference frame also include a portion which has adjacent pixel values varying in a certain range. That is to say, the portions pertaining to a reference frame also include a portion in which a texture exists. Thus, by detecting a pixel in the texture portion as a representative point, a motion vector can be detected with a higher degree of accuracy. For this reason, the representative-point selection section 11 determines whether or not the pixel value of a specific pixel is different from the pixel values of pixels adjacent to the specific pixel. If the pixel value of a specific pixel is different from the pixel values of pixels adjacent to the specific pixel, the representative-point selection section 11 considers the specific pixel to be a proper pixel and detects the proper pixel as a representative point which will be used as a subject, the motion vector of which is to be detected. The representative-point selection section 11 decides one or more proper pixels to serve as representative points. It is to be noted that the representative-point selection section 11 decides all pixels each satisfying a condition determined in advance and takes each of the determined pixels as a representative point. The representative-point selection section 11 does not limit the number of pixels each to be selected to serve as a representative point.

The representative-point selection section 11 supplies information on every pixel of a reference frame to the candidate-vector extraction section 12 as information indicating whether or not the pixel has been decided as a representative point for the reference frame. For example, the information supplied by the representative-point selection section 11 to the candidate-vector extraction section 12 as information on a pixel can be "1" indicating that the pixel is a representative point or "0" indicating that the pixel is not a representative point.

As described above, in this embodiment, for every pixel included in a reference frame, the representative-point selection section 11 generates pixel information of "1" indicating that the pixel is a representative point or pixel information of "0" indicating that the pixel is not a representative point. It is to be noted, however, that the representative-point selection section 11 can also set the number of pixels to be extracted from a reference frame and generate such pixel information only for pixels which have been extracted from the reference frame.

In accordance with control executed by the control section 13, for every representative point, the candidate-vector extraction section 12 extracts candidate vectors each serving as a candidate for a motion vector to be output by the image processing apparatus 1 for the representative point and supplies the candidate vectors to the control section 13. To put it in detail, the candidate-vector extraction section 12 selects a representative point from one or more representative points, which have been determined by the representative-point selection section 11, in accordance with a selection order determined in advance. Then, the candidate-vector extraction section 12 finds a motion vector (u, v) of the selected representative point to serve as a candidate vector. Subsequently, the candidate-vector extraction section 12 repeatedly carries out processing to supply the found motion vector (u, v) to the control section 13 as a candidate vector till the control section 13 requests the candidate-vector extraction section 12 to stop the processing. It is to be noted that, in the following description, in order to distinguish a motion vector (u, v) found by the candidate-vector extraction section 12 from a motion vector output by the image processing apparatus 1, the motion vector (u, v) found by the candidate-vector extraction section 12 is referred to simply as a vector (u, v) which is no more than a candidate for the motion vector output by the image processing apparatus 1.

The control section 13 controls the candidate-vector extraction section 12 and supplies a candidate vector received from the candidate-vector extraction section 12 to the candidate-vector assignment section 14.

The candidate-vector assignment section 14 sets a predetermined pixel on a reference image as an observed pixel which is a pixel observed as the subject of processing. The candidate-vector assignment section 14 selects a candidate vector proper for the observed pixel from a plurality of candidate vectors and decides the selected candidate vector as a motion vector assigned to the observed pixel. Then, the candidate-vector assignment section 14 outputs the motion vector assigned to the observed pixel as an output motion vector of the image processing apparatus 1.

The candidate-vector assignment section 14 can determine any arbitrary pixel on a reference image to serve as an observed pixel. For example, the candidate-vector assignment section 14 sets every pixel on a reference image as an observed pixel and decides a motion vector for each of the pixels on the reference image. As an alternative, a reference frame is divided into a plurality of blocks and only one pixel in each of the blocks is taken as an observed pixel. With only one pixel in each block taken as an observed pixel, motion vectors of all pixels in a block are represented by one motion vector determined for the pixel taken as an observed pixel for the block.

[Flow of Entire Processing Performed by Image Processing Apparatus]

Figure 2:
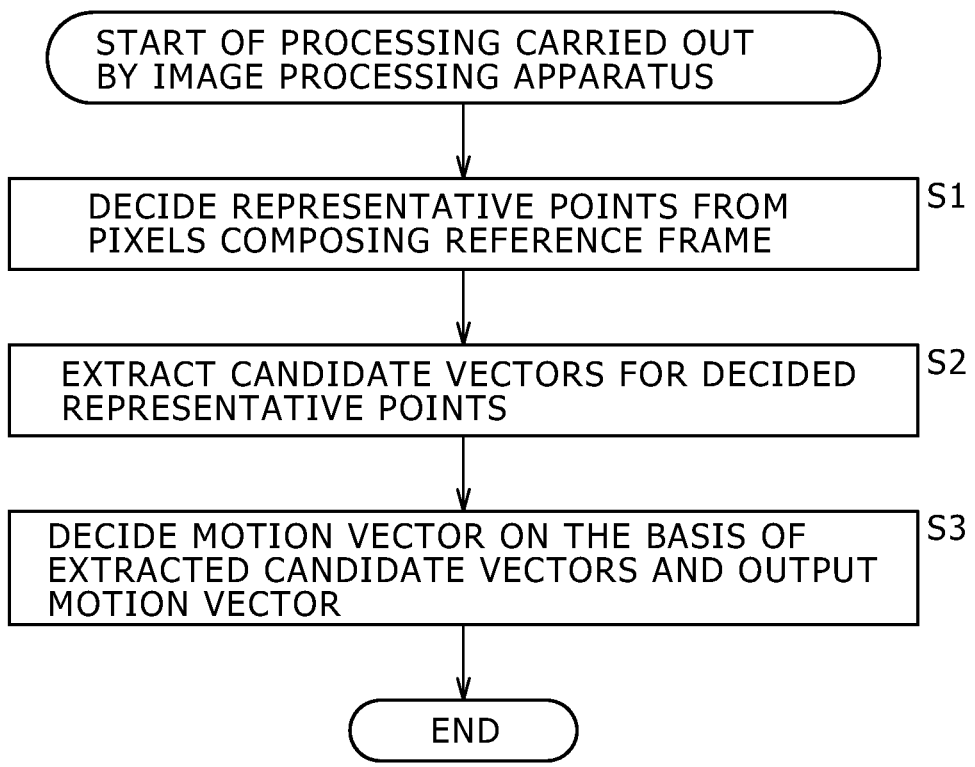
FIG. 2 shows an explanatory flowchart to explain entire processing carried out by the image processing apparatus.

FIG. 2 shows an explanatory flowchart to be referred to in description of entire processing carried out by the image processing apparatus 1.

The image processing apparatus 1 inputs image data including a reference frame and a referenced frame. When the image processing apparatus 1 receives the image data, at a step S1, the representative-point selection section 11 decides one or more pixels to serve as representative points from pixels composing the reference frame. Each of the selected pixels is a proper subject for which a motion vector representing a movement from the position of the pixel on the reference frame to a position of the same pixel on the referenced frame is to be detected. Then, the representative-point selection section 11 supplies information on the representative points to the candidate-vector extraction section 12.

Subsequently, at the next step S2, the candidate-vector extraction section 12 extracts candidate vectors for each of one or more representative points decided by the representative-point selection section 11 and supplies the extracted candidate vectors to the control section 13. When the control section 13 issues an instruction to the candidate-vector extraction section 12 to stop the processing to supply candidate vectors to the control section 13, the candidate-vector extraction section 12 stops the processing to supply candidate vectors to the control section 13. Thus, the candidate-vector extraction section 12 does not necessarily provide the control section 13 with candidate vectors extracted for every representative point decided by the representative-point selection section 11.

Then, at the next step S3, the candidate-vector assignment section 14 decides a motion vector for every representative point representing a pixel on the reference frame on the basis of candidate vectors received from the control section 13 as candidate vectors extracted by the candidate-vector extraction section 12 for the pixel and outputs the motion vector as the output of the image processing apparatus 1. To put it in detail, for every pixel on the reference frame, the candidate-vector assignment section 14 decides a candidate vector proper for the pixel from a plurality of candidate vectors extracted by the candidate-vector extraction section 12 for the pixel and takes the decide candidate vector as the motion vector of the pixel. The candidate-vector assignment section 14 then outputs the motion vector of every pixel on the reference frame as the output of the image processing apparatus 1.

As described above, the image processing apparatus 1 detects a motion vector for every pixel on the reference frame from the input reference frame and the input referenced frame and outputs the motion vectors as vector data.

[Explanation of Representative-Point Matching Technique]

Processing of the image processing apparatus 1 is processing carried out by improving the proposed candidate-vector method disclosed in Patent Documents 1 and 2 cited in the chapter, "Background of the Invention." The following description first explains a portion included in the image processing apparatus 1 to serve as a portion for carrying out the same processing as the processing based on the proposed candidate-vector method disclosed in Patent Documents 1 and 2. The proposed candidate-vector method is one of candidate-vector methods adopted by the image processing apparatus 1.

Figure 3:
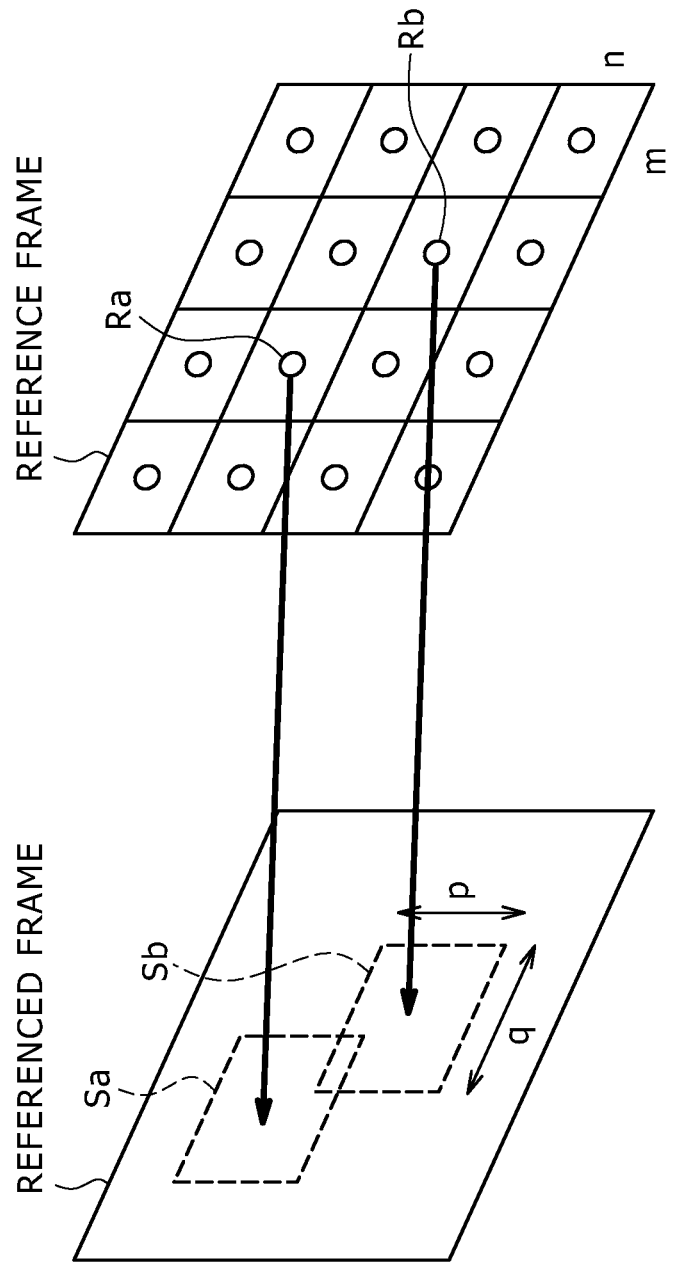
FIG. 3 is an explanatory diagram of processing carried out to generate an evaluation-value table by a representative-point matching technique and computation of a vector (u, v)
Figure 4:
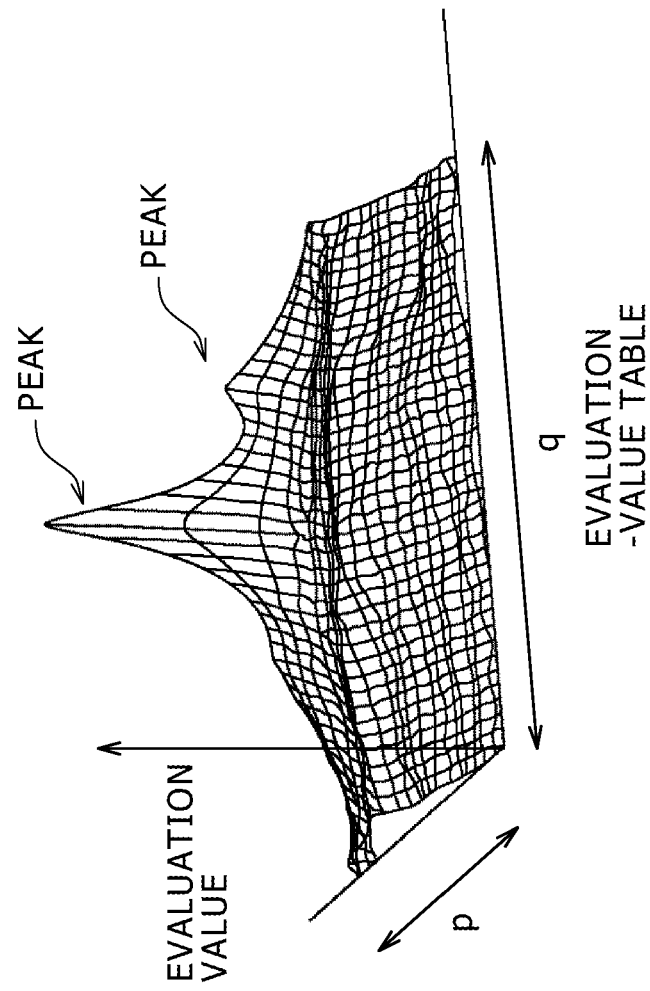
FIGS. 4A and 4B are explanatory diagrams of processing carried out to generate an evaluation-value table by a representative-point matching technique and computation of a vector (u, v)

By referring to FIGS. 3 and 4, the following description explains processing carried out to generate an evaluation-value table by adoption of a representative-point matching technique and computation carried out to find a vector (u, v) which serves as a candidate for the motion vector.

In accordance with the representative-point matching technique, first of all, a search area corresponding to a representative point on the reference frame is set on the referenced frame. The search area corresponding to a representative point on the reference frame has a center which coincides with the position of a pixel on the referenced frame. The pixel on the referenced frame corresponds to the representative point on the reference frame. Typically, the search area associated with a representative point on the reference frame has dimensions of p pixels×q pixels where p and q are each an integer greater than 0 (p, q>0).

In a typical example shown in FIG. 3, a search area Sa on the referenced frame is associated with a representative point Ra on the reference frame whereas a search area Sb on the referenced frame is associated with a representative point Rb on the reference frame.

In order to make the following explanation easy to understand, in the typical example shown in FIG. 3, each of the representative points Ra and Rb coincides with the position of the center pixel of a uniform block obtained as a result of dividing the reference frame into such blocks. Each of the blocks has uniformly a horizontal dimension of m pixels and a vertical dimension of n pixels. It is to be noted, however, that in actuality, representative points are not necessarily distributed uniformly throughout the surface of the reference frame in this way.

Next, for each of the representative points, the image processing apparatus 1 determines a correlation between the representative point and every pixel in a search area set on the referenced frame as a search area associated with the representative point in order to set an evaluation value for each of the pixels in the search area. To put it more concretely, if the pixel value of a pixel in the search area is close to the pixel value of the representative point or, to be more specific, if the difference between the pixel value of a pixel in the search area and the pixel value of the representative point is not greater than a threshold value determined in advance, the evaluation value for the pixel in the search area is set at "1." If the pixel value of a pixel in the search area is not close to the pixel value of the representative point or, to be more specific, if the difference between the pixel value of a pixel in the search area and the pixel value of the representative point is greater than the threshold value determined in advance, on the other hand, the evaluation value for the pixel in the search area is set at "0." As a result, for a representative point, a search area associated with the representative point includes pixels each having an evaluation value of "1" and pixels each having an evaluation value of "0."

The position of a pixel of interest in a search area of interest on a referenced frame of interest corresponds to the position of a pixel included in a search area on another referenced frame adjacent to the referenced frame of interest as a pixel corresponding to the pixel of interest as shown in FIG. 4A showing search areas, which each have dimensions of p pixels×q pixels, on consecutive referenced frames. In the following description, the position of the pixel of interest in a search area of interest on a referenced frame of interest and the positions of pixels each included a search area on another referenced frame adjacent to the referenced frame of interest as a pixel corresponding to the pixel of interest are referred to as corresponding positions. The evaluation values of "1" or "0" found for the pixel of interest and pixels each corresponding to the pixel of interest at the corresponding positions are summed up to result in an evaluation-value sum for the pixel of interest. An evaluation-value sum is thus a sum of evaluation values. Such an evaluation-value sum is found for every pixel in the search area of interest in order to generate an evaluation-value table for the search area of interest. The evaluation-value table is a table of evaluation-value sums each found for one of pixels composing a search area. Thus, like one shown in FIG. 4B, the evaluation-value table has the same dimensions as a search area.

In the evaluation-value table, the higher the correlation of a pixel at a position inside a search area, the larger the evaluation-value sum computed for the pixel at the position (which implies the corresponding positions described above). A high correlation of a pixel at a position inside a search area means that the pixel value of the pixel at the position well matches the pixel value at the representative point associated with the search area. The evaluation-value sum is also referred to as the number of obtained evaluation values of "1." Here, let the coordinates of the center position of a search area be (0, 0). In this case, the coordinates of a position having the largest evaluation-value sum are (u, v) which are coordinates relative to the center position coordinates (0, 0) taken as reference coordinates. In the following description, the largest evaluation-value sum is also referred to as the maximum of evaluation-value sums. Each of reference notations u and v used in the coordinates (u, v) denotes a coordinate value which is an integer. As will be described later, for a search area, the candidate-vector extraction section 12 takes relative position coordinates (u, v) as a candidate vector (u, v). If a representative point is associated with a plurality of search areas, the candidate-vector extraction section 12 takes relative position coordinates (u, v) for each of the search areas which have largest maximums of increasing evaluation-value sums among all the search areas associated with the representative point.

[Detailed Configuration Representative-Point Selection Section]

Next, details of the representative-point selection section 11 are explained as follows.

As described earlier, the candidate-vector extraction section 12 decides a vector (u, v) for a search area on the basis of evaluation-value sums included in the evaluation-value table generated for the search area and eventually takes the decided vector (u, v) as a candidate vector. Thus, by raising the precision of the evaluation-value table, it is possible to increase the precision of a process to extract the candidate vector.

Figure 7:
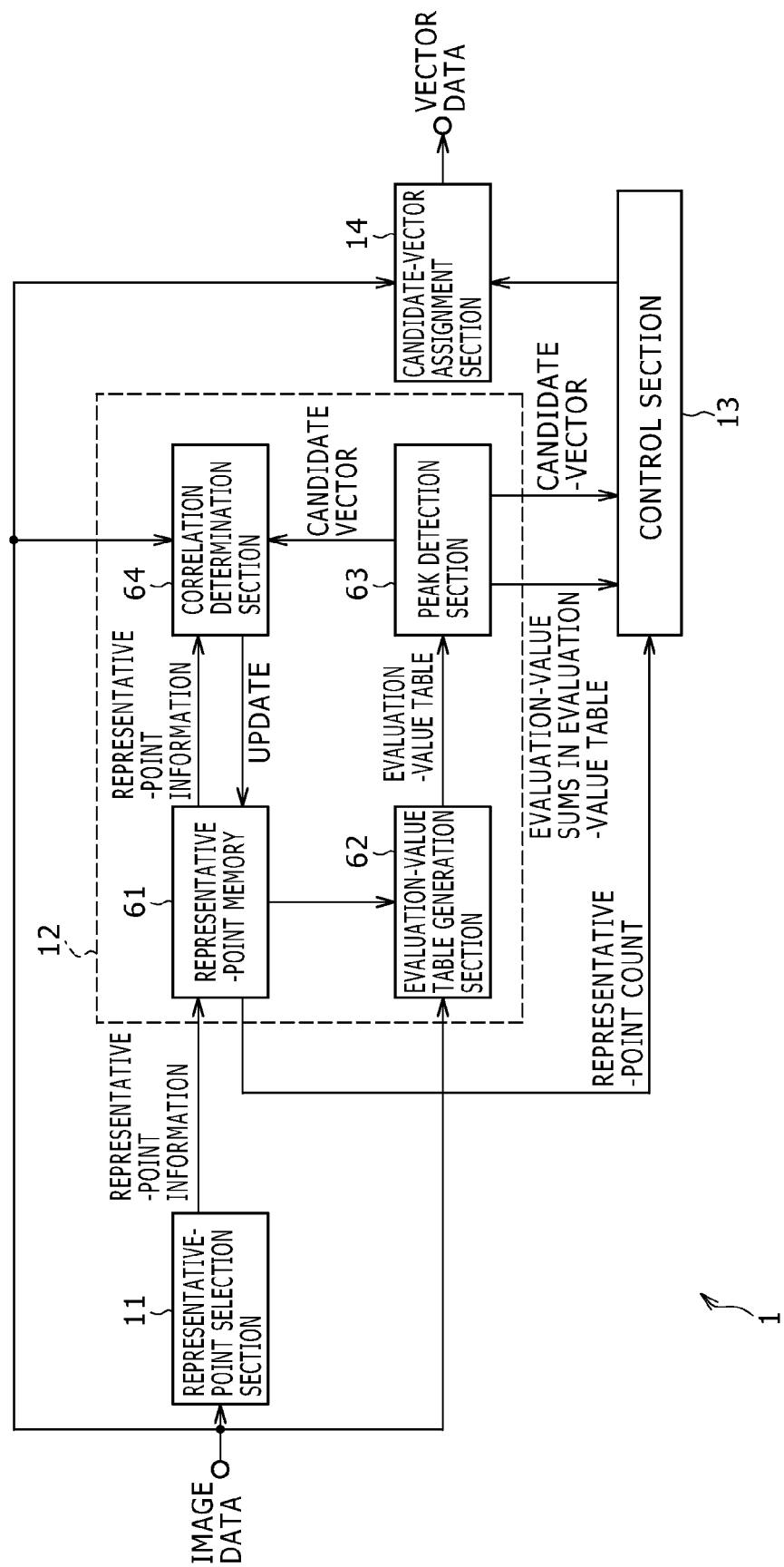
FIG. 7 is a block diagram showing the image processing apparatus including a detailed typical configuration of a candidate-vector extraction section.

For two reasons described below, the representative-point selection section 11 selects a specific pixel having a pixel value different from the pixel values of pixels adjacent to the specific pixel as a representative point. In the first place, in accordance with the representative-point matching technique, the image processing apparatus 1 evaluates a correlation between the pixel value of a pixel in a search area and the pixel value of a pixel at the representative point associated with the search area as described before and stores results of the evaluation in an evaluation-value table. Thus, in order to improve the precision of the evaluation-value table, it is necessary to improve the reliability of the results of the evaluation. In order to improve the reliability of the results of the evaluation, it is desirable to take a texture portion of the reference frame in place of a flat portion as a representative point so as to allow the representative point to be identified uniquely among points in the frame image which is used as the reference frame. In this case, the texture portion is a portion with a texture existing therein. That is to say, the texture portion is a portion showing some changes. On the other hand, the flat portion is a portion showing no changes. In the second place, a correlation determination section 64 employed in the candidate-vector extraction section 12 as shown in FIG. 7 determines a correlation by making use of pixel values of proximity pixels which are a pixel at a representative point and pixels adjacent to the pixel at the representative point. Thus, the representative point is definitely required to have a pixel value different from the pixel values of pixels adjacent to the representative point. It is to be noted that the candidate-vector extraction section 12 will be described later.

For the reasons described above, the representative-point selection section 11 decides whether or not a spatial gradient between the pixel values of any two adjacent pixels exists and detects a pixel with an existing spatial gradient as a representative point from pixels composing the reference frame. The spatial gradient between the pixel values of any two adjacent pixels is the gradient of a line connecting the pixel values. In the following description, the spatial gradient between the pixel values of any two adjacent pixels is also referred to simply as the spatial gradient between the two adjacent pixels in order to make the explanation simpler.

Figure 5:
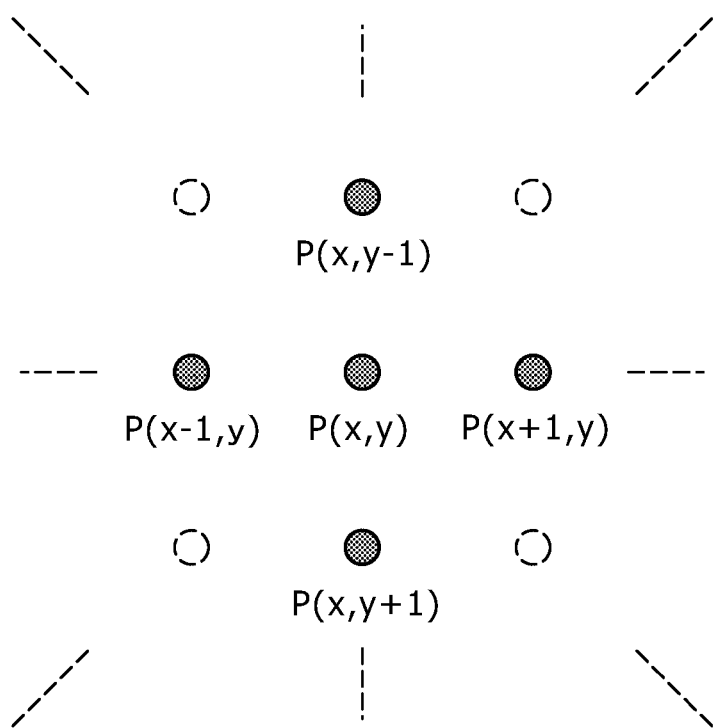
FIG. 5 is an explanatory diagram of proximity pixels used for detecting whether a spatial gradient exists.

FIG. 5 is an explanatory diagram to be referred to in description of proximity pixels (x, y) included in a reference frame as pixels used by the representative-point selection section 11 to detect whether or not a spatial gradient exists between the pixel values P (x, y) of the proximity pixels (x, y).

That is to say, an observed pixel is selected from pixels composing the reference frame to serve as a pixel to be observed. The representative-point selection section 11 determines whether or not the selected pixel is to be taken as a representative point. The coordinates of the observed pixel are (x, y). For the observed pixel (x, y), the representative-point selection section 11 makes use of pixels adjacent to the observed pixel in the horizontal (left-right) direction and the vertical (up-down) direction.

In this case, the pixel value of a pixel (x−1, y) on the left-hand side of the observed pixel (x, y) is P (x−1, y) whereas the pixel value of a pixel (x+1, y) on the right-hand side of the observed pixel (x, y) is P (x+1, y). On the other hand, the pixel value of a pixel (x, y−1) on the upper side of the observed pixel (x, y) is P (x, y−1) whereas the pixel value of a pixel (x, y+1) on the lower side of the observed pixel (x, y) is P (x, y+1).

The pixel value of the observed pixel (x, y) is P (x, y). The representative-point selection section 11 calculates the absolute value of the difference between the pixel value P (x, y) of an observed pixel (x, y) and the pixel value P (x−1, y) of a pixel (x−1, y) on the left-hand side of the observed pixel (x, y) as well as the absolute value of the difference between the pixel value P (x, y) of the observed pixel (x, y) and the pixel value P (x+1, y) of a pixel (x+1, y) on the right-hand side of the observed pixel (x, y). In addition, the representative-point selection section 11 also calculates the absolute value of the difference between the pixel value P (x, y) of the observed pixel (x, y) and the pixel value P (x, y−1) of a pixel (x, y−1) on the upper side of the observed pixel (x, y) as well as the absolute value of the difference between the pixel value P (x, y) of the observed pixel (x, y) and the pixel value P (x, y+1) of a pixel (x, y+1) on the lower side of the observed pixel (x, y).

Then, the representative-point selection section 11 compares each of the calculated absolute values with a threshold value determined in advance in order to determine whether or not a spatial gradient exists between the pixel value P (x, y) and the pixel value P (x−1, y), between the pixel value P (x, y) and the pixel value P (x+1, y), between the pixel value P (x, y) and the pixel value P (x, y−1) as well as between the pixel value P (x, y) and the pixel value P (x, y+1). The representative-point selection section 11 determines that a spatial gradient exists in the direction of a horizontal line passing through the observed pixel (x, y) only if a spatial gradient exists between the pixel value P (x, y) and the pixel value P (x−1, y) or between the pixel value P (x, y) and the pixel value P (x+1, y). Independently of the operation to determine the existence of the spatial gradient in the direction of the horizontal line, the representative-point selection section 11 determines that a spatial gradient exists in the direction of a vertical line passing through the observed pixel (x, y) only if a spatial gradient exists between the pixel value P (x, y) and the pixel value P (x, y−1) or between the pixel value P (x, y) and the pixel value P (x, y+1). Finally, the representative-point selection section 11 takes the observed pixel (x, y) as a representative point only if a spatial gradient exists in the direction of the horizontal line and a spatial gradient exists in the direction of the vertical line.

Figure 6:
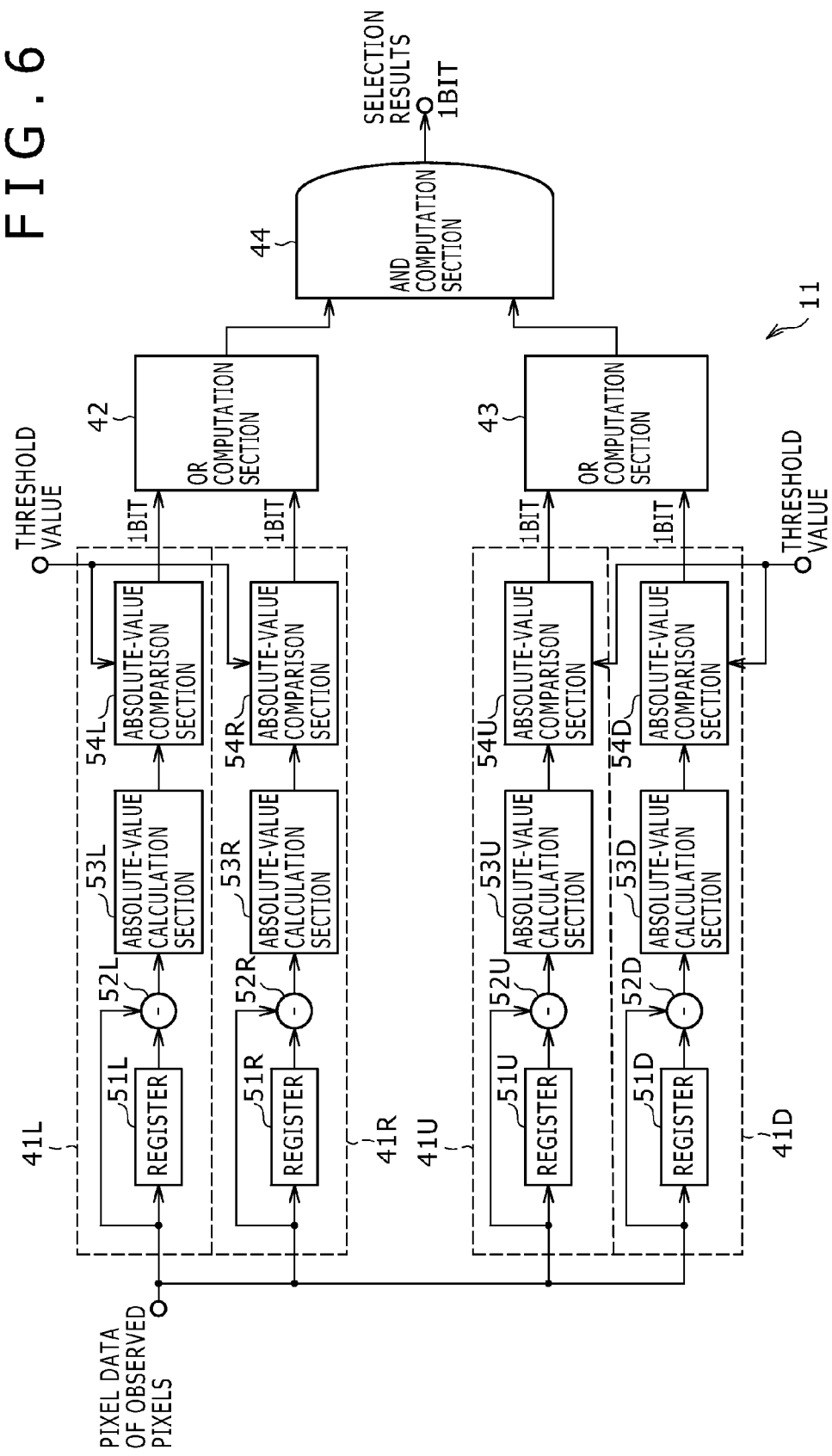
FIG. 6 is a block diagram showing details of a typical configuration of a representative-point selection section.

FIG. 6 is a block diagram showing details of a typical configuration of the representative-point selection section 11.

As shown in the block diagram, the representative-point selection section 11 is configured to include a left-side gradient calculation section 41L, a right-side gradient calculation section 41R, an upper-side gradient calculation section 41U, a lower-side gradient calculation section 41D, an OR computation section 42, an OR computation section 43 and an AND computation section 44.

The left-side gradient calculation section 41L is a section for determining the existence of a spatial gradient between an observed pixel and a pixel on the left-hand side of the observed pixel and for outputting a determination result having a length of 1 bit. By the same token, the right-side gradient calculation section 41R is a section for determining the existence of a spatial gradient between an observed pixel and a pixel on the right-hand side of the observed pixel and for outputting a determination result having a length of 1 bit. In the same way, the upper-side gradient calculation section 41U is a section for determining the existence of a spatial gradient between an observed pixel and a pixel on the upper side of the observed pixel and for outputting a determination result having a length of 1 bit. Likewise, the lower-side gradient calculation section 41D is a section for determining the existence of a spatial gradient between an observed pixel and a pixel on the lower side of the observed pixel and for outputting a determination result having a length of 1 bit.

The left-side gradient calculation section 41L employs a register 51L, a subtraction section 52L, an absolute-value calculation section 53L and a comparison section 54L. The suffix L appended to each of reference symbols 41L, 51L, 52L, 53L and 54L indicates that the left-side gradient calculation section 41L, the register 51L, the subtraction section 52L, the absolute-value calculation section 53L and the comparison section 54L are components for determining the existence of a spatial gradient between an observed pixel and a pixel on the left (L)—hand side of the observed pixel. By the same token, the right-side gradient calculation section 41R employs a register 51R, a subtraction section 52R, an absolute-value calculation section 53R and a comparison section 54R. The suffix R appended to each of reference symbols 41R, 51R, 52R, 53R and 54R indicates that the right-side gradient calculation section 41R, the register 51R, the subtraction section 52R, the absolute-value calculation section 53R and the comparison section 54R are components for determining the existence of a spatial gradient between an observed pixel and a pixel on the right (R)—hand side of the observed pixel. In the same way, the upper-side gradient calculation section 41U employs a register 51U, a subtraction section 52U, an absolute-value calculation section 53U and a comparison section 54U. The suffix U appended to each of reference symbols 41U, 51U, 52U, 53U and 54U indicates that the upper-side gradient calculation section 41U, the register 51U, the subtraction section 52U, the absolute-value calculation section 53U and the comparison section 54U are components for determining the existence of a spatial gradient between an observed pixel and a pixel on the upper (U) side of the observed pixel. Similarly, the lower-side gradient calculation section 41D employs a register 51D, a subtraction section 52D, an absolute-value calculation section 53D and a comparison section 54D. The suffix D appended to each of reference symbols 41D, 51D, 52D, 53D and 54D indicates that the lower-side gradient calculation section 41D, the register 51D, the subtraction section 52D, the absolute-value calculation section 53D and the comparison section 54D are components for determining the existence of a spatial gradient between an observed pixel and a pixel on the lower (D) side of the observed pixel.

As an example, operations carried out by the left-side gradient calculation section 41L are explained as follows. Let a pixel value P (x, y) shown in FIG. 5 be the pixel value of an observed pixel (x, y). In this case, the register 51L contains a pixel value P (x−1, y) of a pixel (x−1, y) on the left-hand side of the observed pixel (x, y). The pixel value P (x−1, y) stored in the register 51L is a pixel value to be compared with the pixel value P (x, y) of the observed pixel (x, y). It is the subtraction section 52L that compares the pixel value P (x−1, y) stored in the register 51L as the pixel value of the pixel (x−1, y) on the left-hand side of the observed pixel with the pixel value P (x, y) of the observed pixel (x, y). The subtraction section 52L generates a comparison result which is the difference between the pixel value P (x−1, y) and the pixel value P (x, y). The absolute-value calculation section 53L then finds the absolute value of the difference generated by the subtraction section 52L. Subsequently, the comparison section 54L compares the absolute value found by the absolute-value calculation section 53L with a threshold value determined in advance. If the comparison section 54L finds out that the absolute value is greater than the threshold value determined in advance, the comparison section 54L determines that a spatial gradient exists between the observed pixel (x, y) and the pixel (x−1, y) on the left-hand side of the observed pixel (x, y). In this case, the comparison section 54L outputs a bit having a value of "1." If the comparison section 54L finds out that the absolute value is equal to or smaller than the threshold value determined in advance, on the other hand, the comparison section 54L determines that a spatial gradient does not exist between the observed pixel (x, y) and the pixel (x−1, y) on the left-hand side of the observed pixel (x, y). In this case, the comparison section 54L outputs a bit having a value of "0."

Operations carried out by each of the right-side gradient calculation section 41R, the upper-side gradient calculation section 41U and the lower-side gradient calculation section 41D are similar to the operations carried out by the left-side gradient calculation section 41L except that a pixel value compared with the pixel value P (x, y) of the observed pixel (x, y) in each of the right-side gradient calculation section 41R, the upper-side gradient calculation section 41U and the lower-side gradient calculation section 41D is different from the pixel value P (x−1, y) compared with the pixel value P (x, y) of the observed pixel (x, y) in the left-side gradient calculation section 41L. For this reason, the operations carried out by each of the right-side gradient calculation section 41R, the upper-side gradient calculation section 41U and the lower-side gradient calculation section 41D are not explained.

The OR computation section 42 receives the 1-bit information generated by the comparison section 54L to indicate whether or not a spatial gradient exists between the observed pixel and the pixel on the left-hand side of the observed pixel as well as the 1-bit information generated by the comparison section 54R to indicate whether or not a spatial gradient exists between the observed pixel and the pixel on the right-hand side of the observed pixel. The OR computation section 42 computes the logical sum of two bits, that is, the bit of the information received from the comparison section 54L and the bit of the information received from the comparison section 54R, outputting the logical sum to the AND computation section 44. To put it more concretely, the OR computation section 42 sets the logical sum at "1" if a spatial gradient exists between the observed pixel and the pixel on the left-hand side of the observed pixel or between the observed pixel and the pixel on the right-hand side of the observed pixel. In addition, the OR computation section 42 also sets the logical sum at "1" if a spatial gradient exists between the observed pixel and the pixel on the left-hand side of the observed pixel as well as between the observed pixel and the pixel on the right-hand side of the observed pixel. If a spatial gradient neither exists between the observed pixel and the pixel on the left-hand side of the observed pixel nor exists between the observed pixel and the pixel on the right-hand side of the observed pixel, on the other hand, the OR computation section 42 sets the logical sum at "0."

By the same token, the OR computation section 43 receives the 1-bit information generated by the comparison section 54U to indicate whether or not a spatial gradient exists between the observed pixel and the pixel on the upper side of the observed pixel as well as the 1-bit information generated by the comparison section 54D to indicate whether or not a spatial gradient exists between the observed pixel and the pixel on the lower side of the observed pixel. The OR computation section 43 computes the logical sum of two bits, that is, the bit of the information received from the comparison section 54U and the bit of the information received from the comparison section 54D, outputting the logical sum to the AND computation section 44. To put it more concretely, the OR computation section 43 sets the logical sum at "1" if a spatial gradient exists between the observed pixel and the pixel on the upper side of the observed pixel or between the observed pixel and the pixel on the lower side of the observed pixel. In addition, the OR computation section 43 also sets the logical sum at "1" if a spatial gradient exists between the observed pixel and the pixel on the upper side of the observed pixel as well as between the observed pixel and the pixel on the lower side of the observed pixel. If a spatial gradient neither exists between the observed pixel and the pixel on the upper side of the observed pixel nor exists between the observed pixel and the pixel on the lower side of the observed pixel, on the other hand, the OR computation section 43 sets the logical sum at "0."

The AND computation section 44 receives the 1-bit logical sum generated by the OR computation section 42 to indicate whether or not a spatial gradient oriented in the horizontal direction exists and the 1-bit logical sum generated by the OR computation section 43 to indicate whether or not a spatial gradient oriented in the vertical direction exists. The AND computation section 44 computes the logical product of two input bits, that is, the bit of the logical sum received from the OR computation section 42 and the bit of the logical sum received from the OR computation section 43, outputting the logical product as the output of the representative-point selection section 11. To put it more concretely, the AND computation section 44 sets the logical product at "1" only if both a spatial gradient oriented in the horizontal direction and a spatial gradient oriented in the vertical direction exist. If a spatial gradient oriented in the horizontal direction or a spatial gradient oriented in the vertical direction does not exist, on the other hand, the AND computation section 44 sets the logical product at "0." In addition, the AND computation section 44 also sets the logical product at "0" if both the spatial gradient oriented in the horizontal direction and the spatial gradient oriented in the vertical direction do not exist.

As described above, the representative-point selection section 11 decides a specific pixel exhibiting spatial gradients with respect to pixels adjacent to the specific pixel as a representative point. Thus, a highly reliable evaluation-value table can be generated. As a result, vector detection can be carried out with a high degree of precision.

[Detailed Configuration of Candidate-Vector Extraction Section]

Next, details of the candidate-vector extraction section 12 are explained as follows.

FIG. 7 is a block diagram showing the image processing apparatus 1 including a detailed typical configuration of the candidate-vector extraction section 12.

As shown in the block diagram, the candidate-vector extraction section 12 is configured to include a representative-point memory 61, an evaluation-value table generation section 62, a peak detection section 63 and a correlation determination section 64.

The representative-point memory 61 is used for storing pieces of representative-point information received from the representative-point selection section 11 as information on pixels of the reference frame. Each piece of representative-point information on a pixel of the reference frame indicates whether or not the pixel is a representative point. Typically, representative-point information set at "1" indicates that the pixel associated with the information is a representative point whereas representative-point information set at "0" indicates that the pixel associated with the information is not a representative point. In addition, the correlation determination section 64 updates the representative-point information stored in the representative-point memory 61. When the representative-point information is updated, an updated representative-point count is read out from the representative-point memory 61 and supplied to the control section 13. The updated representative-point count is a result of the operation carried out by the correlation determination section 64 to update the representative-point information. The representative-point count is the number of representative points.

In order to generate an evaluation-value table, the evaluation-value table generation section 62 carries out processing to generate an evaluation-value table by adoption of the representative-point matching technique which has been explained earlier by referring to FIGS. 3 and 4. That is to say, for all representative points stored in the representative-point memory 61 at this point of time, the evaluation-value table generation section 62 sums up the evaluation values of matching pixels existing at corresponding positions in matching search areas on successive referenced frames in order to find a sum of evaluation values and generate an evaluation-value table used for storing such sums. The evaluation-value table generation section 62 supplies the generated evaluation-value table to the peak detection section 63.

The peak detection section 63 searches the evaluation-value table received from the evaluation-value table generation section 62 for the position of a peak which is the maximum of the evaluation-value sums stored in the evaluation-value table. The peak detection section 63 provides the control section 13 and the correlation determination section 64 with the relative position (u, v) at which the evaluation-value sum becomes equal to the maximum. The peak detection section 63 supplies the relative position (u, v) to the control section 13 and the correlation determination section 64 as a vector (u, v). In addition, the peak detection section 63 provides the control section 13 with the detected maximum of the evaluation-value sums stored in the evaluation-value table. As described above, the detected maximum of the evaluation-value sums stored in the evaluation-value table is the evaluation-value sum corresponding to the vector (u, v).

When the control section 13 receives the vector (u, v) and the maximum of the evaluation-value sums stored in the evaluation-value table from the peak detection section 63, the control section 13 determines whether or not the maximum of the evaluation-value sums stored in the evaluation-value table and the representative-point count received from the representative-point memory 61 satisfy a condition determined in advance. If the control section 13 determines that the maximum of the evaluation-value sums stored in the evaluation-value table and the representative-point count received from the representative-point memory 61 satisfy the condition determined in advance, the control section 13 takes the vector (u, v) as a candidate vector. As described above, the control section 13 has received the vector (u, v) as well as the maximum of the evaluation-value sums stored in the evaluation-value table from the peak detection section 63. If the control section 13 determines that the maximum of the evaluation-value sums stored in the evaluation-value table and the representative-point count received from the representative-point memory 61 do not satisfy the condition determined in advance, on the other hand, the control section 13 requests the candidate-vector extraction section 12 to terminate the processing to extract candidate vectors. Thus, as long as the control section 13 determines that the maximum of the evaluation-value sums stored in the evaluation-value table and the representative-point count received from the representative-point memory 61 satisfy the condition determined in advance, the control section 13 takes every vector (u, v) received from the peak detection section 63 as a candidate vector. For this reason, in the following description, the vector (u, v) is also referred to as a candidate vector (u, v).

For every representative point stored in the representative-point memory 61, the correlation determination section 64 determines a correlation between the representative point on the reference frame and a referenced point on the referenced frame. The referenced point is an end pixel located at the end of the vector (u, v) starting from a start pixel which is also a pixel on the referenced frame. The start pixel is a pixel corresponding to the representative point. If the result of the correlation determination indicates that the correlation between the representative point and the referenced point is high, the correlation determination section 64 regards the representative point as a representative point which is supported by the candidate vector (u, v). In this case, the correlation determination section 64 deletes the information on the representative point from the representative-point information stored in the representative-point memory 61. To put it more concretely, the correlation determination section 64 changes the representative-point information stored in the representative-point memory 61 to serve as the information on the representative point, which has been determined to have a high correlation with the referenced point, from "1" to "0."

[Flow of Processing to Extract Candidate Vector]

Figure 8:
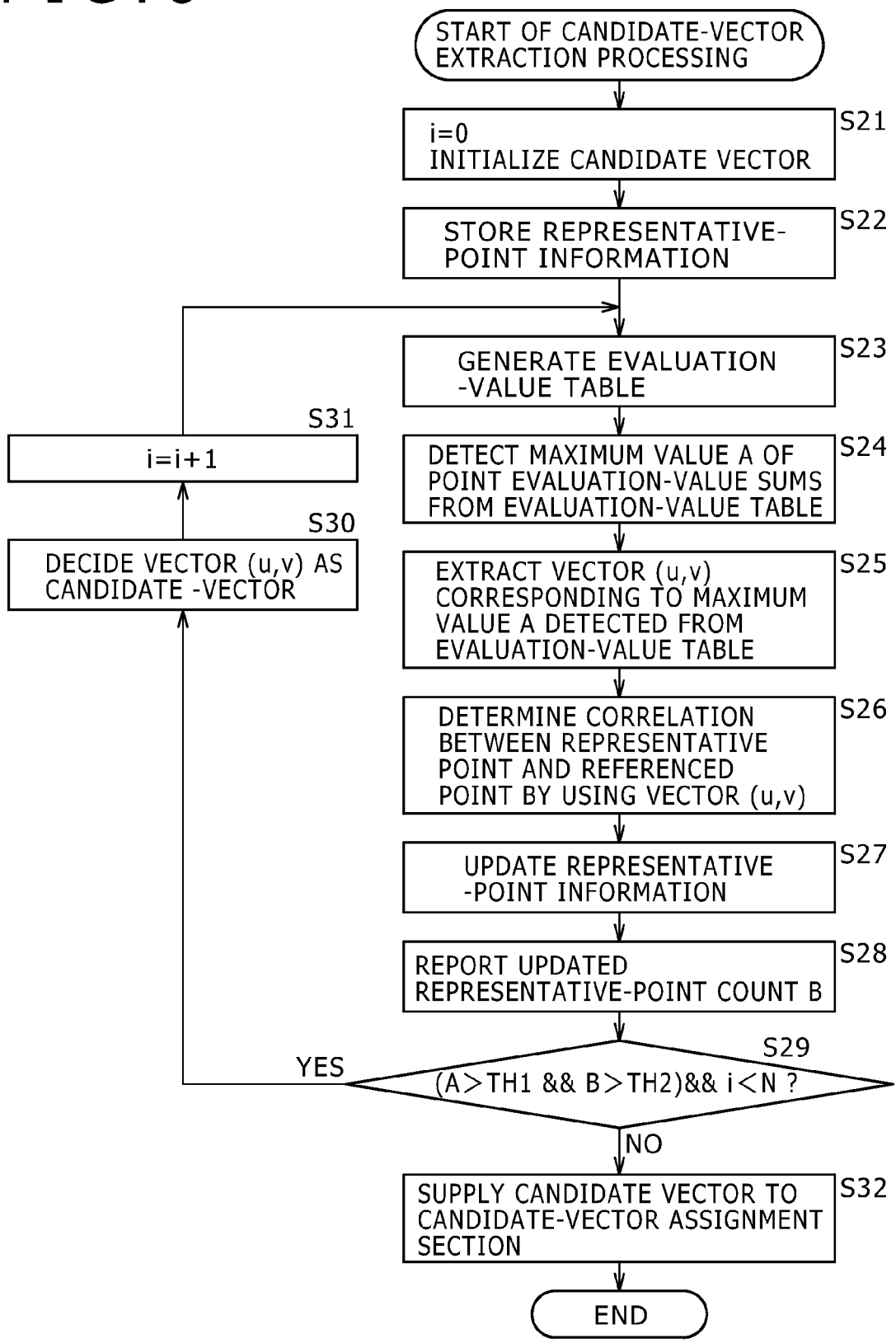
FIG. 8 shows an explanatory flowchart of processing carried out to extract a candidate vector.

Processing carried out by the candidate-vector extraction section 12 and the control section 13 to extract a candidate vector is explained by referring to a flowchart shown in FIG. 8.

As shown in the figure, the flowchart begins with a step S21 at which the control section 13 initializes a counter i by setting the counter i at zero and initializes candidate vectors found in the past.

Then, at the next step S22, representative-point information supplied by the representative-point selection section 11 is stored in the representative-point memory 61.

Subsequently, at the next step S23, the evaluation-value table generation section 62 carries out processing to generate an evaluation-value table by adoption of the representative-point matching technique which has been explained earlier by referring to FIGS. 3 and 4. In this way, the evaluation-value table generation section 62 generates an evaluation-value table. That is to say, for every representative point stored in the representative-point memory 61 at this point of time, the evaluation-value table generation section 62 sums up the evaluation values of pixels existing in search areas each matching the representative point in order to find a sum of evaluation values for the pixels. Subsequently, the evaluation-value table generation section 62 generates an evaluation-value table used for storing such evaluation-value sums each computed for a pixel in the search area on the referenced frame. The evaluation-value table generation section 62 then supplies the generated evaluation-value table to the peak detection section 63.

Then, at the next step S24, the peak detection section 63 searches the evaluation-value table received from the evaluation-value table generation section 62 for the position of a peak which is the maximum A of the evaluation-value sums stored in the evaluation-value table.

Subsequently, at the next step S25, the peak detection section 63 extracts a vector (u, v) for the maximum A. That is to say, the peak detection section 63 extracts the relative position (u, v) of the maximum A as a position corresponding to the vector (u, v). The peak detection section 63 provides the control section 13 and the correlation determination section 64 with the relative position (u, v) at which the evaluation-value sum becomes equal to the maximum. That is to say, the peak detection section 63 supplies the relative position (u, v) to the control section 13 and the correlation determination section 64 as the vector (u, v). In addition, the peak detection section 63 provides the control section 13 with the detected maximum A of the evaluation-value sums stored in the evaluation-value table.

Then, at the next step S26, for every representative point stored in the representative-point memory 61, the correlation determination section 64 decides a referenced point on the referenced frame by making use of the vector (u, v). Subsequently, the correlation determination section 64 determines a correlation between the representative point and the referenced point.

Subsequently, at the next step S27, the correlation determination section 64 updates the representative-point information stored in the representative-point memory 61 on the basis of a result of the operation to determine a correlation between the representative point and the referenced point. To put it more concretely, the correlation determination section 64 changes the representative-point information stored in the representative-point memory 61 to serve as information on the representative point, which has been determined to have a high correlation with the referenced point, from "1" to "0."

Then, at the next step S28, the correlation determination section 64 supplies a representative-point count B to the control section 13. The representative-point count B is the number of representative points which each have the representative-point information thereof changed from "1" to "0" in the operation carried out by the correlation determination section 64 to update the representative-point information.

Subsequently, at the next step S29, the control section 13 determines whether or not a significant candidate vector has been detected. To put it more concretely, the control section 13 determines whether or not the maximum A found from the evaluation-value table is greater than a threshold value TH1, the representative-point count B is greater than a threshold value TH2 and the value of the counter i is smaller than N which is an integer determined in advance. If the maximum A found from the evaluation-value table is greater than the threshold value TH1, the representative-point count B is greater than the threshold value TH2 and the value of the counter i is smaller than N, the control section 13 determines that a significant candidate vector has been detected. That is to say, if the maximum A found from the evaluation-value table is large to a certain degree, a number of pixels for the same vector (u, v) exist and the number of detected candidate vectors is still smaller than N, the control section 13 determines that a significant candidate vector has been detected. If the maximum A found from the evaluation-value table is small, few pixels for the same vector (u, v) exist or a sufficient number of candidate vectors have already been detected, that is, at least N candidate vectors have already been detected, on the other hand, the control section 13 determines that no significant candidate vector has been detected.

Here, unlike the number of candidate vectors extracted in accordance with a proposed method disclosed in documents such as Patent Documents 1 and 2 cited in the chapter with a title of "Background of the Invention," the limiting integer N used as the upper limit of the number of detected candidate vectors (u, v) can be set at the maximum value of the number of candidate vectors that can be extracted for a representative point. Thus, the restriction imposed by the integer N can be omitted from the determination condition used at the step S29.

If the control section 13 determines at the step S29 that a significant candidate vector has been detected, the flow of the processing to detect candidate vectors goes on to a step S30 at which the control section 13 decides a vector (u, v) for the maximum A, which has been received from the peak detection section 63, as a candidate vector.

Subsequently, at the next step S31, the control section 13 increments the value of the counter i by 1. Then, the flow of the processing to detect candidate vectors goes back to the step S23. Subsequently, the processes of the steps S23 to S29 are carried out again. That is to say, an evaluation-value table is generated again on the basis of representative-point information obtained as a result the updating of the representative-point information. Then, a maximum A is detected from the generated evaluation-value table and a vector (u, v) for the maximum A is extracted. Subsequently, a correlation between the representative point and a referenced point selected by making use of the vector (u, v) is determined and the representative-point information is again updated on the basis of the result of the operation to determine the correlation between the representative point and the referenced point.

If the control section 13 determines at the step S29 that no significant candidate vector has been detected, on the other hand, the flow of the processing to detect candidate vectors goes on to a step S32 at which the control section 13 provides the candidate-vector assignment section 14 with candidate vectors which have been determined sequentially one after another at processes carried out repeatedly as loop processing of the steps S23 to S31.

If the loop processing described above is terminated at the step S29 because the condition set for the maximum A and/or the condition set for the representative-point count B are not satisfied, the number of detected candidate vectors is 1. If the loop processing described above is terminated because of the restriction imposed by the integer N serving as the upper limit, on the other hand, the number of detected candidate vectors is N.

As is obvious from the above description, unlike the proposed candidate-vector extraction processing disclosed in Patent Documents 1 and 2 cited in the chapter with a title of "Background of the Invention" as processing to extract candidate vectors, the number of which is set in advance, in the candidate-vector extraction processing described above, the number of candidate vectors to be extracted is not determined in advance. That is to say, the processing described above as processing to extract candidate vectors is repeated as long as the existence of a significant candidate vector is determined. Thus, as many candidate vectors as existing ones can be extracted so as to result in neither candidate-vector excess nor candidate-vector deficiency.

As explained earlier by referring to the flowchart shown in FIG. 2, the candidate-vector assignment section 14 decides a motion vector of every pixel on a reference frame from significant candidate vectors extracted by the candidate-vector extraction section 12. Thus, by extracting as many significant candidate vectors as existing ones so as to result in neither candidate-vector excess nor candidate-vector deficiency, highly precise motion vectors can be detected with few inaccurate motion vectors inadvertently detected by mistake.

[Detailed Configuration of Correlation Determination Section]

In the processing to extract a candidate vector in accordance with the flowchart shown in FIG. 8, for every representative point stored in the representative-point memory 61, at the step S26 of the flowchart, the correlation determination section 64 determines a correlation between the representative point and a referenced point determined by making use of a candidate vector (u, v).

The following description explains details of processing carried out by the correlation determination section 64 to determine a correlation between a representative point and a referenced point determined by making use of a candidate vector (u, v).

Figure 9:
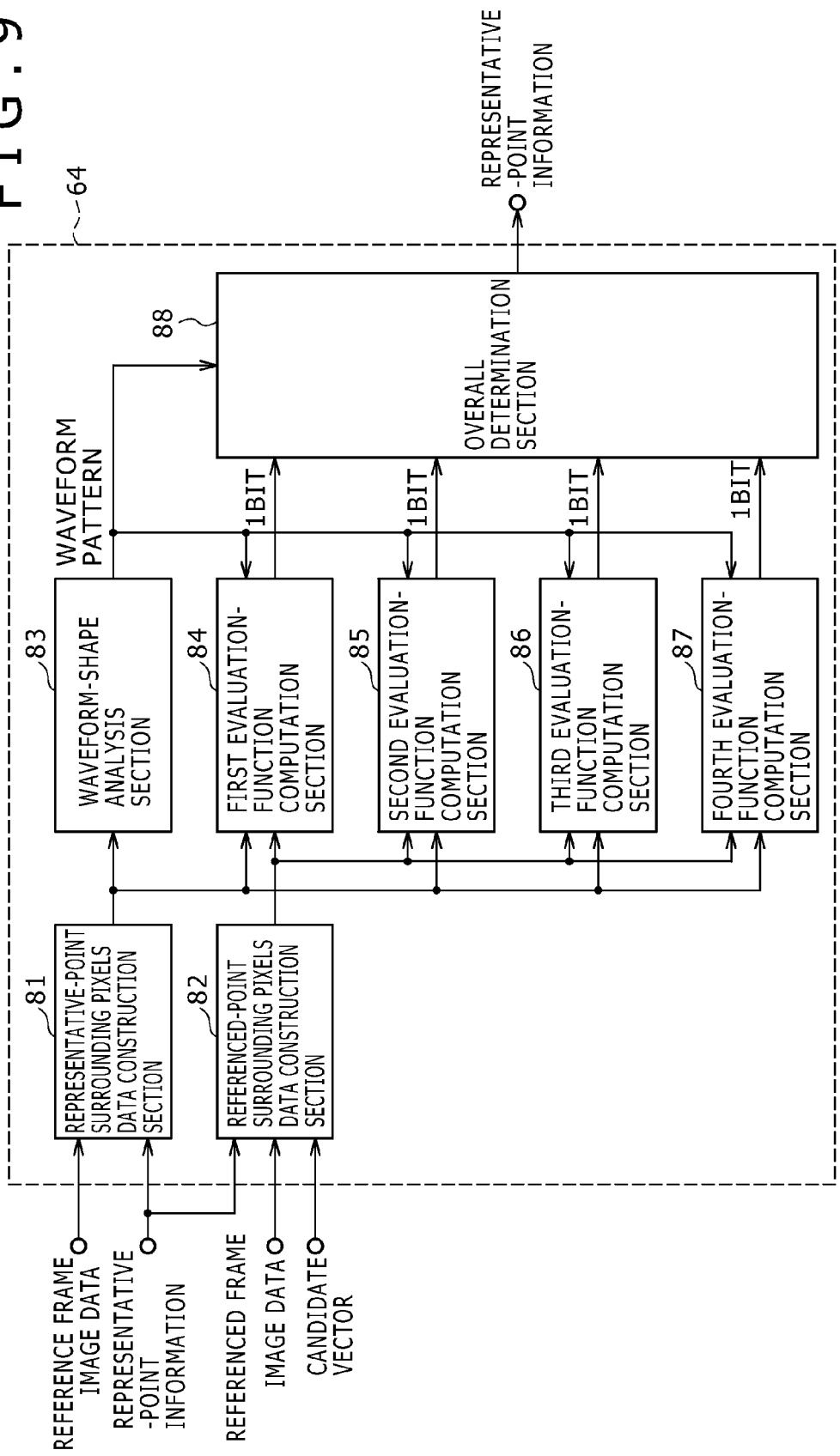
FIG. 9 is a block diagram showing details of a typical configuration of a correlation determination section.

FIG. 9 is a block diagram showing details of a typical configuration of the correlation determination section 64.

As shown in the block diagram, the correlation determination section 64 is configured to include a representative-point surrounding pixels data construction section 81, a referenced-point surrounding pixels data construction section 82, a waveform-shape analysis section 83, a first evaluation-function computation section 84, second evaluation-function computation section 85, a third evaluation-function computation section 86, a fourth evaluation-function computation section 87 and an overall determination section 88.

By making use of a candidate vector (u, v), the correlation determination section 64 determines a correlation between a representative point existing on the reference frame as indicated by representative-point information stored in the representative-point memory 61 and a referenced point on the referenced frame. That is to say, the correlation determination section 64 determines a correlation between the representative point and the referenced point pointed to by the candidate vector (u, v) starting at a pixel which exists on the referenced frame as a pixel corresponding to the representative point. Then, the correlation determination section 64 regards a representative point determined to have a high correlation with the referenced point as a representative point with a significant candidate vector (u, v) and deletes the information on the representative point from the representative-point memory 61. To put it more concretely, the correlation determination section 64 changes the representative-point information stored in the representative-point memory 61 to serve as information on the representative point, which has been determined to have a high correlation with the referenced point, from "1" to "0."

A candidate vector (u, v) detected by the peak detection section 63 shown in FIG. 7 is expressed in terms of integers u and v as described before. However, a vector truly connecting a pixel on the reference frame to a pixel on the referenced frame is expressed in terms of real numbers. The vector truly connecting a pixel on the reference frame to a pixel on the referenced frame is a true motion vector. That is to say, while the precision of the candidate vector (u, v) is determined by the integer-level resolution, the motion of a real object is expressed in terms of a true motion vector having precision determined by the resolution set at the real-number level. In order to solve this problem, the correlation determination section 64 considers a shorter-than-1-pixel shift in the detection of the candidate vector (u, v) having precision determined by integer-level resolution. In order to take a shorter-than-1-pixel shift into consideration, the correlation determination section 64 determines a correlation between the representative point and the referenced point by making use of also pixels close to the representative point and the referenced point. The shorter-than-1-pixel shift is defined as a pixel shift which is shorter than the shift-direction size of a pixel.

For every representative point stored in the representative-point memory 61 as a representative of points on the reference frame, the representative-point surrounding pixels data construction section 81 constructs representative-point surrounding pixels data which is pixel data of the representative point and pixels adjacent to the representative point. The representative-point surrounding pixels data construction section 81 supplies the representative-point surrounding pixels data constructed by the representative-point surrounding pixels data construction section 81 as pixel data of the representative point and pixels adjacent to the representative point to the waveform-shape analysis section 83, the first evaluation-function computation section 84, the second evaluation-function computation section 85, the third evaluation-function computation section 86 and the fourth evaluation-function computation section 87.

On the other hand, the referenced-point surrounding pixels data construction section 82 constructs referenced-point surrounding pixels data which is pixel data of a referenced point on the referenced frame and pixels adjacent to the referenced point. The referenced point is a pixel located at the end of a candidate vector (u, v) originating from a pixel which exists on the referenced frame as a pixel corresponding to the representative point on the reference frame. The referenced-point surrounding pixels data construction section 82 supplies the referenced-point surrounding pixels data constructed by the referenced-point surrounding pixels data construction section 82 as pixel data of a referenced point on the referenced frame and pixels adjacent to the referenced point to the first evaluation-function computation section 84, the second evaluation-function computation section 85, the third evaluation-function computation section 86 and the fourth evaluation-function computation section 87.

The pixels adjacent to the representative point used by the representative-point surrounding pixels data construction section 81 in constructing the representative-point surrounding pixels data are a pixel on the right-hand side of the representative point, a pixel on the left-hand side of the representative point, a pixel on the upper side of the representative point and a pixel on the lower side of the representative point in the same way as the representative-point selection section 11 which makes use of pixels adjacent to a specific pixel in a process of taking the specific pixel as a representative point as explained earlier by referring to FIG. 5.

Figure 10:
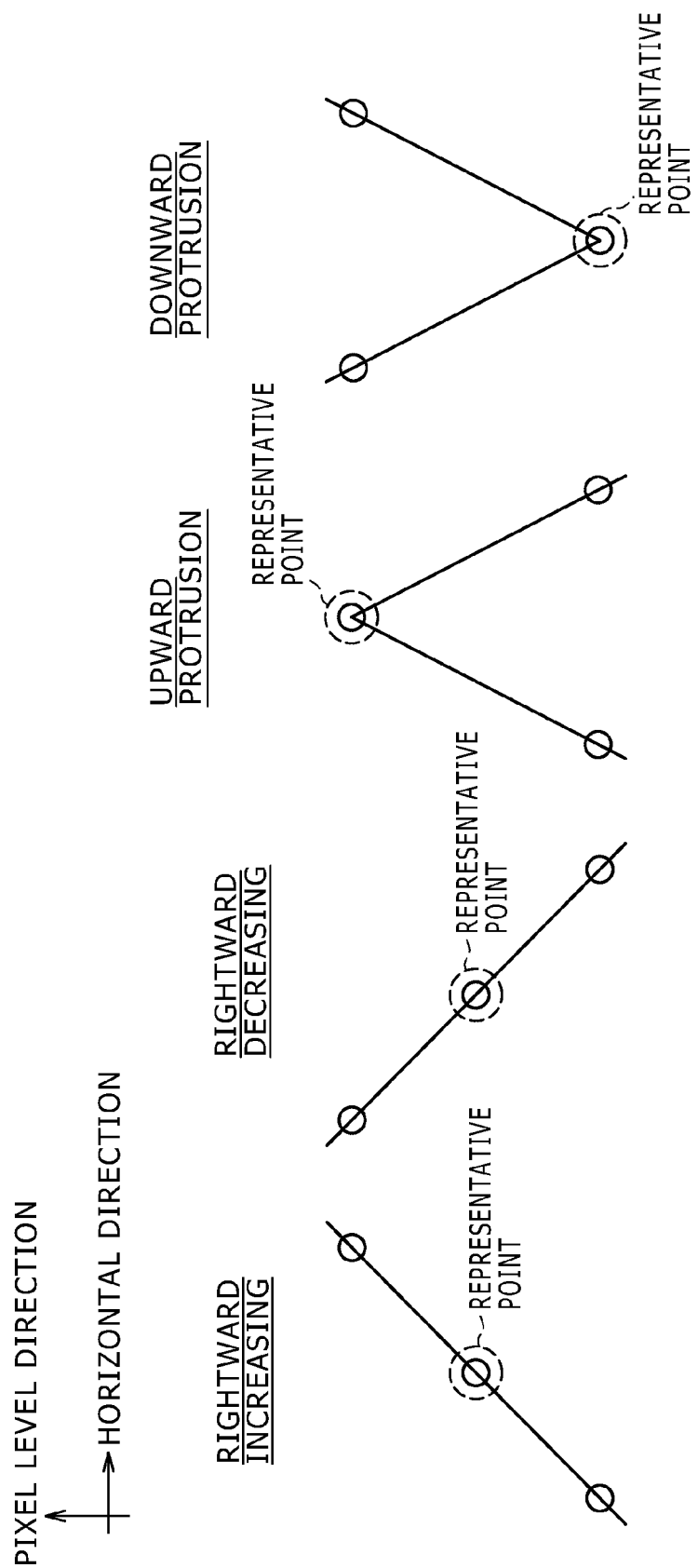
FIG. 10 is a diagram showing types of a waveform pattern.

The waveform-shape analysis section 83 analyzes waveform patterns which are each the shape of a spatial gradient. The waveform pattern is created as a line connecting the pixel values of three adjacent pixels. The waveform pattern created as a line connecting the pixel values of three adjacent pixels can be a vertical-direction waveform pattern or a horizontal-direction waveform pattern. In either case, the middle one of the three pixels is a representative point. The representative point is a pixel that has been selected by the representative-point selection section 11 as a pixel exhibiting a spatial gradient. The horizontal-direction waveform pattern can be a rightward increasing waveform pattern or a rightward decreasing waveform pattern. The rightward increasing waveform pattern is a pattern which is rightward increasing whereas the rightward decreasing waveform pattern is a pattern which is rightward decreasing. On the other hand, the vertical-direction waveform pattern can be an upward-protrusion waveform pattern or a downward-protrusion waveform pattern. The upward-protrusion waveform pattern is a pattern having an upward protrusion whereas the downward-protrusion waveform pattern is a pattern having a downward protrusion. The rightward increasing waveform pattern, the rightward decreasing waveform pattern, the upward-protrusion waveform pattern and the downward-protrusion waveform pattern are shown in FIG. 10. The waveform-shape analysis section 83 analyzes a waveform pattern created as a line connecting the pixel values of three adjacent pixels, the middle one of which is a representative point, in order to determine whether the waveform pattern is a rightward increasing waveform pattern, a rightward decreasing waveform pattern, an upward-protrusion waveform pattern or a downward-protrusion waveform pattern. The waveform-shape analysis section 83 then supplies the result of the analysis to the first evaluation-function computation section 84, the second evaluation-function computation section 85, the third evaluation-function computation section 86, the fourth evaluation-function computation section 87 and the overall determination section 88. The result of the analysis is information indicating whether the waveform pattern is a rightward increasing waveform pattern, a rightward decreasing waveform pattern, an upward-protrusion waveform pattern or a downward-protrusion waveform pattern.

The first evaluation-function computation section 84 computes the value of a first horizontal-direction evaluation function F1 (or a first vertical-direction evaluation function G1) on the basis of the pixel values of three adjacent pixels, the middle one of which is a representative point. As shown in FIG. 15, the first evaluation function F1 or the first vertical-direction evaluation function G1 varies, depending on whether the waveform pattern is a rightward increasing waveform pattern, a rightward decreasing waveform pattern, an upward-protrusion waveform pattern or a downward-protrusion waveform pattern. The first evaluation-function computation section 84 supplies the value of the first horizontal-direction evaluation function F1 or the first vertical-direction evaluation function G1 to the overall determination section 88 as the result of the computation. The result of the computation is 1-bit information. The first horizontal-direction evaluation function F1 is a first horizontal-direction evaluation function provided for a rightward increasing waveform pattern or a rightward decreasing waveform pattern. As shown in FIG. 15, the first horizontal-direction evaluation function F1 provided for a rightward increasing waveform pattern is different from the first horizontal-direction evaluation function F1 provided for a rightward decreasing waveform pattern. On the other hand, the first vertical-direction evaluation function G1 is a first vertical-direction evaluation function provided for an upward-protrusion waveform pattern or a downward-protrusion waveform pattern. By the same token, the first vertical-direction evaluation function G1 provided for an upward-protrusion waveform pattern is different from the first vertical-direction evaluation function G1 provided for a downward-protrusion waveform pattern.

The second evaluation-function computation section 85 is same with the first evaluation-function computation section 84 except that the second evaluation-function computation section 85 carries out processing on second evaluation functions in place of the first evaluation functions processed by the first evaluation-function computation section 84. To put it in detail, the second evaluation-function computation section 85 computes the value of a second horizontal-direction evaluation function F2 (or a second vertical-direction evaluation function G2) on the basis of the pixel values of three adjacent pixels, the middle one of which is a representative point. As shown in FIG. 15, the second horizontal-direction evaluation function F2 (or the second vertical-direction evaluation function G2) varies, depending on whether the waveform pattern is a rightward increasing waveform pattern, a rightward decreasing waveform pattern, an upward-protrusion waveform pattern or a downward-protrusion waveform pattern. The second evaluation-function computation section 85 supplies the value of the second horizontal-direction evaluation function F2 (or the second vertical-direction evaluation function G2) to the overall determination section 88 as the result of the computation. The result of the computation is 1-bit information. The second horizontal-direction evaluation function F2 is a second horizontal-direction evaluation function provided for a rightward increasing waveform pattern or a rightward decreasing waveform pattern. As shown in FIG. 15, the second horizontal-direction evaluation function F2 provided for a rightward increasing waveform pattern is different from the second horizontal-direction evaluation function F2 provided for a rightward decreasing waveform pattern. On the other hand, the second vertical-direction evaluation function G2 is a second vertical-direction evaluation function provided for an upward-protrusion waveform pattern or a downward-protrusion waveform pattern. By the same token, the second vertical-direction evaluation function G2 provided for an upward-protrusion waveform pattern is different from the second vertical-direction evaluation function G2 provided for a downward-protrusion waveform pattern.

The third evaluation-function computation section 86 is same with the first evaluation-function computation section 84 except that the third evaluation-function computation section 86 carries out processing on third evaluation functions in place of the first evaluation functions processed by the first evaluation-function computation section 84. By the same token, the fourth evaluation-function computation section 87 is same with the first evaluation-function computation section 84 except that the fourth evaluation-function computation section 87 carries out processing on fourth evaluation functions in place of the first evaluation functions processed by the first evaluation-function computation section 84.

The overall determination section 88 integrates the four 1-bit computation results received from the first evaluation-function computation section 84, the second evaluation-function computation section 85, the third evaluation-function computation section 86 and the fourth evaluation-function computation section 87 respectively in order to finally determine whether or not the correlation between the representative point and the referenced point is high. If the correlation between the representative point and the referenced point is found high, the overall determination section 88 changes the representative-point information stored in the representative-point memory 61 as information on the representative point from "1" to "0."

[Correlation Determination Processing for Rightward Increasing Waveform Patterns]

Next, by referring to FIG. 11, the following description explains details of processing carried out to determine a correlation for a case in which the waveform pattern of three horizontal-direction adjacent pixels is a rightward increasing waveform pattern. In this case, the middle one of the three horizontal-direction adjacent pixels is a representative point.

As described above, while the precision of the candidate vector (u, v) is determined by the integer-level resolution, the motion of a real object is expressed in terms of a true motion vector having precision determined by the resolution set at the real-number level. Thus, even if the candidate vector (u, v) is used to superpose the representative point and the referenced point on each other, the representative point basically does not coincide with the referenced point. Accordingly, when the referenced point and the representative point are superposed on each other, a pixel shift shorter than the shift-direction size of one pixel exists between the referenced point and the representative point. In the following description, the pixel shift shorter than the shifting-direction size of one pixel is properly referred to as a shorter-than-1-pixel shift sx. Due to the shorter-than-1-pixel shift sx, a pixel-value shift is also generated between the pixel value of the referenced point and the pixel value of the representative point. In the following description, the pixel-value shift caused by the shorter-than-1-pixel shift sx is referred to as an inter-frame pixel-value difference dt. Depending on the direction of the shorter-than-1-pixel shift sx, the inter-frame pixel-value difference dt can be oriented in a direction toward the plus side or a direction toward the minus side.

FIG. 11 is a plurality of explanatory diagrams to be referred to in description of a case in which the representative point (x, y) and the referenced point (x+u, y+v) located at the end of the candidate vector (u, v) are shifted away from each other by a distance having precision determined by the integer-level resolution.

It is to be noted that, in FIG. 11, the pixel value of the representative point (x, y) is denoted by reference symbol P (x, y) whereas the pixel value of the referenced point (x+u, y+v) located at the end of the candidate vector (u, v) on the referenced frame is denoted by reference symbol Q (x+u, y+v). As described earlier, the candidate vector (u, v) is a vector originating from a point located on the referenced frame as a point corresponding to the representative point (x, y).

In FIG. 11, however, it is sufficient to consider only the horizontal-direction waveform pattern of three adjacent pixels whose middle one is a representative point. Thus, diagrams for coordinates in the y direction are omitted. Accordingly, in FIG. 11, the pixel value of the representative point is denoted by reference symbol P (x) whereas the pixel value of the referenced point is denoted by reference symbol Q (x+u).

In FIG. 11, the x axis represents relative coordinates of the representative point and the referenced point whereas the y axis represents pixel values which are each also referred to as a pixel level.

Figure 11B:
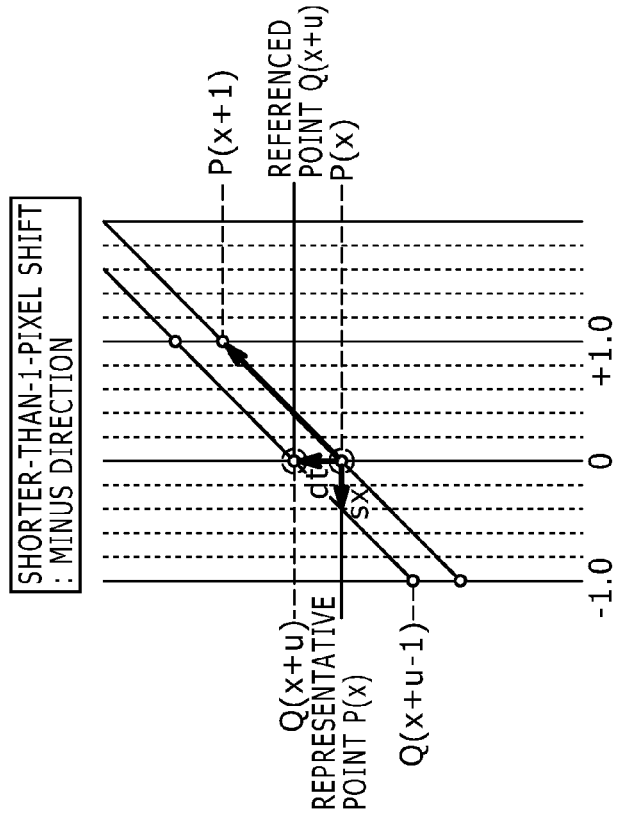
FIGS. 11A and 11B are explanatory diagrams of details of correlation determination processing for a case in which the type of the waveform pattern has a rightward increasing shape.
Figure 11A:
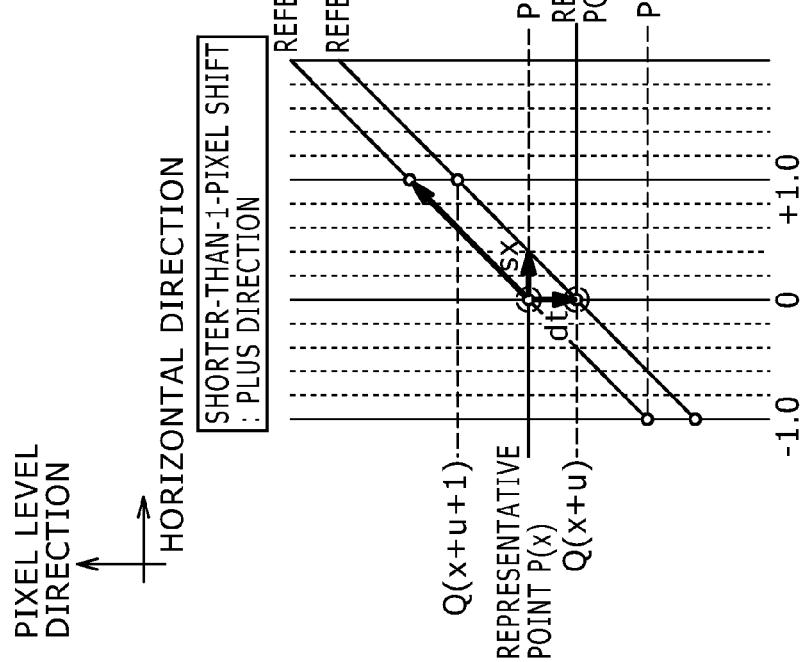

FIG. 11A is an explanatory diagram showing the inter-frame pixel-value difference dt for a case in which the shorter-than-1-pixel shift sx is oriented in the plus direction. In the case of a shorter-than-1-pixel shift sx oriented in the plus direction, the waveform pattern is a rightward increasing waveform pattern. Thus, the inter-frame pixel-value difference dt between the representative point and the referenced point is oriented in the minus direction.

Accordingly, if a relation between the representative point and the referenced point is taken into consideration by taking the representative point as a reference, as shown in FIG. 11A, the pixel value P (x) of the representative point should be a pixel value between the pixel value Q (x+u) of the referenced point and the pixel value Q (x+u+1) of a pixel on the right-hand side of the referenced point.

That is to say, the pixel value P (x) of the representative point satisfies the following relations:

$$P(x) \geq Q(x+u) \&\& P(x) \leq Q(x+u+1) \quad (1)$$

In addition, if a relation between the representative point and the referenced point is taken into consideration by taking the referenced point as a reference, the pixel value Q (x+u) of the referenced point should be a pixel value between the pixel value P (x) of the representative point and the pixel value P (x−1) of a pixel on the left-hand side of the representative point.

That is to say, the pixel value Q (x+u) of the referenced point satisfies the following relations:

$$Q(x+u) \geq P(x-1) \&\& Q(x+u) \leq P(x) \quad (2)$$

If a relation between the representative point and the referenced point is taken into consideration by taking the representative point as a reference, for a case in which the horizontal-direction waveform pattern is a rightward increasing waveform pattern, the first evaluation-function computation section 84 computes the value of the first horizontal-direction evaluation function F1 in accordance with Equation (3) given as follows:

$$F1 = \{P(x) \geq Q(x+u) \&\& P(x) \leq Q(x+u+1)\} ? 1 : 0 \quad (3)$$

A relation enclosed in braces { } in Equation (3) given above is relations (1) described before. In accordance with Equation (3), the first evaluation-function computation section 84 sets the value of the first horizontal-direction evaluation function F1 at "1" as the result of the computation if the relations enclosed in braces { } are satisfied. If the relations enclosed in braces { } are not satisfied, on the other hand, the first evaluation-function computation section 84 sets the value of the first horizontal-direction evaluation function F1 at "0" as the result of the computation.

If a relation between the representative point and the referenced point is taken into consideration by taking the referenced point as a reference, for a case in which the horizontal-direction waveform pattern is a rightward increasing waveform pattern, the second evaluation-function computation section 85 computes the value of the second horizontal-direction evaluation function F2 in accordance with Equation (4) given as follows:

$$F2 = \{Q(x+u) \geq P(x-1) \&\& Q(x+u) \leq P(x)\} ? 1 : 0 \quad (4)$$

A relation enclosed in braces { } in Equation (4) given above is relations (2) described before. In accordance with Equation (4), the second evaluation-function computation section 85 sets the value of the second horizontal-direction evaluation function F2 at "1" as the result of the computation if the relations enclosed in braces { } are satisfied. If the relations enclosed in braces { } are not satisfied, on the other hand, the second evaluation-function computation section 85 sets the value of the second horizontal-direction evaluation function F2 at "0" as the result of the computation.

FIG. 11B is an explanatory diagram showing the dt for a case in which the shorter-than-1-pixel shift sx is oriented in the minus direction. In the case of a shorter-than-1-pixel shift sx oriented in the minus direction, the waveform pattern is a rightward increasing waveform pattern. Thus, the inter-frame pixel-value difference dt between the representative point and the referenced point is oriented in the plus direction.

Accordingly, if a relation between the representative point and the referenced point is taken into consideration by taking the representative point as a reference, as shown in FIG. 11B, the pixel value P (x) of the representative point should be a pixel value between the pixel value Q (x+u) of the referenced point and the pixel value Q (x+u−1) of a pixel on the left-hand side of the referenced point.

That is to say, the pixel value P (x) of the representative point satisfies the following relations:

$$P(x) \geq Q(x+u-1) \,\&\&\, P(x) \leq Q(x+u) \tag{5}$$

In addition, if a relation between the representative point and the referenced point is taken into consideration by taking the referenced point as a reference, the pixel value Q (x+u) of the referenced point should be a pixel value between the pixel value P (x) of the representative point and the pixel value P (x+1) of a pixel on the right-hand side of the representative point.

That is to say, the pixel value Q (x+u) of the referenced point satisfies the following relations:

$$Q(x+u) \geq P(x) \,\&\&\, Q(x+u) \leq P(x+1) \tag{6}$$

If a relation between the representative point and the referenced point is taken into consideration by taking the representative point as a reference, for a case in which the horizontal-direction waveform pattern is a rightward increasing waveform pattern, the third evaluation-function computation section 86 computes the value of the third horizontal-direction evaluation function F3 in accordance with Equation (7) as follows:

$$F3 = \{P(x) \geq Q(x+u-1) \,\&\&\, P(x) \leq Q(x+u)\} ? 1 : 0 \tag{7}$$

A relation enclosed in braces { } in Equation (7) given above is relations (5) described before. In accordance with Equation (7), the third evaluation-function computation section 86 sets the value of the third horizontal-direction evaluation function F3 at "1" as the result of the computation if the relations enclosed in braces { } are satisfied. If the relations enclosed in braces { } are not satisfied, on the other hand, the third evaluation-function computation section 86 sets the value of the first horizontal-direction evaluation function F1 at "0" as the result of the computation.

If a relation between the representative point and the referenced point is taken into consideration by taking the referenced point as a reference, for a case in which the horizontal-direction waveform pattern is a rightward increasing waveform pattern, the fourth evaluation-function computation section 87 computes the value of the fourth horizontal-direction evaluation function F4 in accordance with Equation (8) as follows:

$$F4 = \{Q(x+u) \geq P(x) \,\&\&\, Q(x+u) \leq P(x+1)\} ? 1 : 0 \tag{8}$$

A relation enclosed in braces { } in Equation (8) given above is relations (6) described before. In accordance with Equation (8), the fourth evaluation-function computation section 87 sets the value of the fourth horizontal-direction evaluation function F4 at "1" as the result of the computation if the relations enclosed in braces { } are satisfied. If the relations enclosed in braces { } are not satisfied, on the other hand, the fourth evaluation-function computation section 87 sets the value of the fourth horizontal-direction evaluation function F4 at "0" as the result of the computation.

The above description is given for horizontal-direction waveform patterns only. By replacing reference notation x with reference notation y and replacing reference notation u with reference notation v in the above description, the above description also holds true for vertical-direction waveform patterns as well. In particular, by replacing reference notation x with reference notation y and replacing reference notation u with reference notation v in Equation (3) used for computing the value of the first horizontal-direction evaluation function F1, Equation (4) used for computing the value of the second horizontal-direction evaluation function F2, Equation (7) used for computing the value of the third horizontal-direction evaluation function F3 and Equation (8) used for computing the value of the fourth horizontal-direction evaluation function F4, Equations (3), (4), (7) and (8) can be applied to the first vertical-direction evaluation function G1, the second vertical-direction evaluation function G2, the third vertical-direction evaluation function G3 and the fourth vertical-direction evaluation function G4 respectively.

To put it more concretely, for a case in which the vertical-direction waveform pattern is a rightward increasing waveform pattern, the first evaluation-function computation section 84 computes the value of the first vertical-direction evaluation function G1 in accordance with Equation (9) as follows:

$$G1 = \{P(y) \geq Q(y+v) \,\&\&\, P(y) \leq Q(y+v+1)\} ? 1 : 0 \tag{9}$$

By the same token, for a case in which the vertical-direction waveform pattern is a rightward increasing waveform pattern, the second evaluation-function computation section 85 computes the value of the first vertical-direction evaluation function G2 in accordance with Equation (10) as follows:

$$G2 = \{Q(y+v) \geq P(y-1) \,\&\&\, Q(y+v) \leq P(y)\} ? 1 : 0 \tag{10}$$

In the same way, for a case in which the vertical-direction waveform pattern is a rightward increasing waveform pattern, the third evaluation-function computation section 86 computes the value of the third vertical-direction evaluation function G3 in accordance with Equation (11) as follows:

$$G3 = \{P(y) \geq Q(y+v-1) \,\&\&\, P(y) \leq Q(y+v)\} ? 1 : 0 \tag{11}$$

Likewise, for a case in which the vertical-direction waveform pattern is a rightward increasing waveform pattern, the fourth evaluation-function computation section 87 computes the value of the fourth vertical-direction evaluation function G4 in accordance with Equation (12) as follows:

$$G4 = \{Q(y+v) \geq P(y) \,\&\&\, Q(y+v) \leq P(y+1)\} ? 1 : 0 \tag{12}$$

For a case in which each of the horizontal-direction waveform pattern and the vertical-direction waveform pattern is a rightward increasing waveform pattern, the overall determination section 88 receives the value computed in accordance with Equation (3) as the value of first horizontal-direction evaluation function F1, the value computed in accordance with Equation (4) as the value of second horizontal-direction evaluation function F2, the value computed in accordance with Equation (7) as the value of third horizontal-direction evaluation function F3, the value computed in accordance with Equation (8) as the value of fourth horizontal-direction evaluation function F4, the value computed in accordance with Equation (9) as the value of first vertical-direction evaluation function G1, the value computed in accordance with Equation (10) as the value of second vertical-direction evaluation function G2, the value computed in accordance with Equation (11) as the value of third vertical-direction evaluation function G3 and the value computed in accordance with Equation (12) as the value of fourth vertical-direction evaluation function G4.

Next, an overall determination process carried out by the overall determination section 88 is explained as follows.

In the case of a horizontal-direction waveform pattern, the relation between the representative point and the referenced point can be taken into consideration by taking the representative point or the referenced point as a reference. Thus, it is necessary to compute only either the value of the first horizontal-direction evaluation function F1 in accordance with Equation (3) based on relations (1) or the value of the second horizontal-direction evaluation function F2 in accordance with Equation (4) based on relations (2). By the same token, it is necessary to compute only either the value of the third horizontal-direction evaluation function F3 in accordance with Equation (7) based on relations (5) or the value of the second horizontal-direction evaluation function F4 in accordance with Equation (8) based on relations (6). Accordingly, as overall correlation determination for a horizontal-direction waveform pattern, the overall determination section 88 computes the value of an overall horizontal-direction evaluation function F in accordance with Equation (13) which is given as follows:

$$F=\{(F1|F2)xor(F3|F4)\}?1:0 \quad (13)$$

Notation 'xor' used in Equation (13) given above denotes an operator for computing an exclusive logic sum of operands on the left-hand and right-hand sides of the operator.

By the same token, as overall correlation determination for a vertical-direction waveform pattern, the overall determination section 88 computes the value of an overall vertical-direction evaluation function G in accordance with Equation (14) which is given as follows:

$$G=\{(G1|G2)xor(G3|G4)\}?1:0 \quad (14)$$

Then, the overall determination section 88 integrates the value of the overall horizontal-direction evaluation function F for the horizontal-direction waveform pattern and the value of the overall vertical-direction evaluation function G for the vertical-direction waveform pattern in order to produce a final correlation determination result.

If the representative point and the referenced point are pixels correlated with each other, a correlation should exist in the horizontal direction and the vertical direction. Thus, as final correlation determination, the overall determination section 88 computes the value of a final evaluation function H in accordance with Equation (15) which is given as follows:

$$H=F\&G \quad (15)$$

In accordance with Equation (15) given above, the value of the final evaluation function H is "1" only if both the value of the overall horizontal-direction evaluation function F and the value of the overall vertical-direction evaluation function G are "1." If the value of the overall horizontal-direction evaluation function F is "0," the value of the overall vertical-direction evaluation function G is "0" or the value of the overall horizontal-direction evaluation function F and the value of the overall vertical-direction evaluation function G are both "0," the value of the final evaluation function H is also "0."

If the overall determination section 88 determines that the correlation between the representative point and the referenced point is high on the basis of a value computed in accordance with Equation (15) as the value of the final evaluation function H, that is, if the computed value of the final evaluation function H is "1," the correlation determination section 64 employing the overall determination section 88 changes the representative-point information stored in the representative-point memory 61 to serve as information on the representative point, which has been determined to have a high correlation with the referenced point, from "1" to "0."

[Correlation Determination Processing for Rightward Decreasing Waveform Patterns]

Figure 12A:
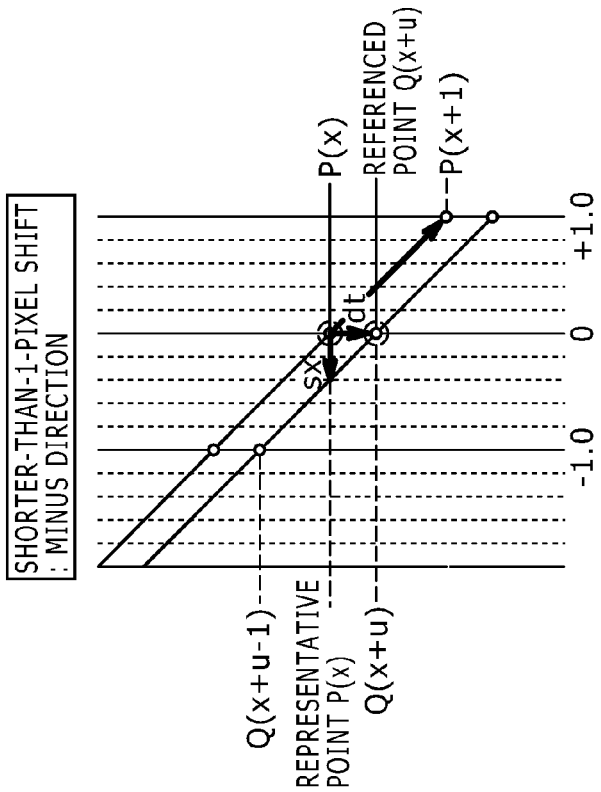
FIGS. 12A and 12B are explanatory diagrams of details of correlation determination processing for a case in which the type of the waveform pattern has a rightward decreasing shape.
Figure 12B:
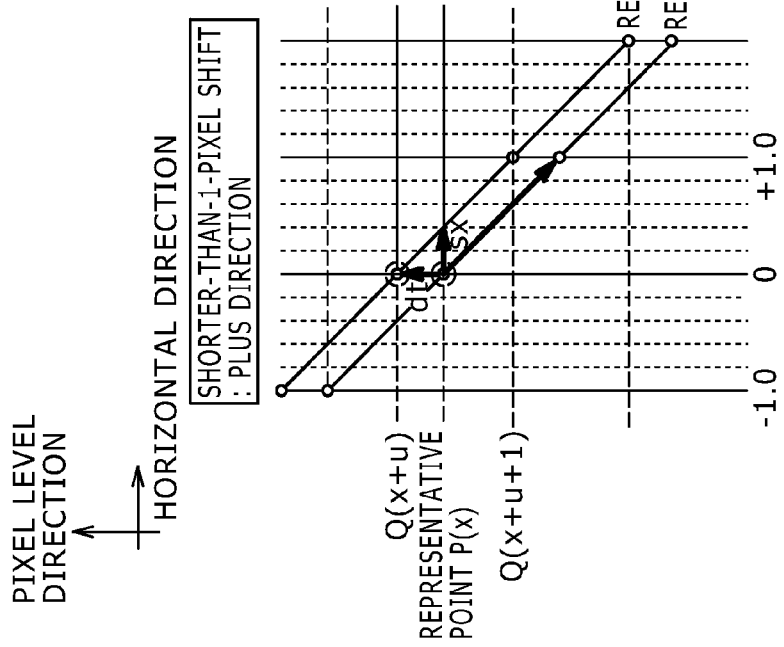

Next, by referring to FIG. 12, the following description explains details of processing carried out to determine a correlation for a case in which the waveform pattern of three horizontal-direction adjacent pixels is a rightward decreasing waveform pattern. In this case, the middle one of the three horizontal-direction adjacent pixels is a representative point.

Much like FIG. 11, FIG. 12 is a plurality of explanatory diagrams to be referred to in description of a case in which the representative point and the referenced point are superposed on each other with precision determined by the integer-level resolution for a rightward decreasing waveform pattern.

If the horizontal-direction waveform pattern is a rightward decreasing waveform pattern and the shorter-than-1-pixel shift sx is oriented in the plus direction, from a relation established between the representative point and the referenced point with the representative point taken as a reference, the first evaluation-function computation section 84 computes the value of the first horizontal-direction evaluation function F1 in accordance with Equation (16) which is given as follows.

$$F1=\{P(x)\geq Q(x+u+1)\&\&P(x)\leq Q(x+u)\}?1:0 \quad (16)$$

If the horizontal-direction waveform pattern is a rightward decreasing waveform pattern and the shorter-than-1-pixel shift sx is oriented in the plus direction, from a relation established between the representative point and the referenced point with the referenced point taken as a reference, the second evaluation-function computation section 85 computes the value of the second horizontal-direction evaluation function F2 in accordance with Equation (17) which is given as follows.

$$F2=\{Q(x+u)\geq P(x)\&\&Q(x+u)\leq P(x-1)\}?1:0 \quad (17)$$

If the horizontal-direction waveform pattern is a rightward decreasing waveform pattern and the shorter-than-1-pixel shift sx is oriented in the minus direction, from a relation established between the representative point and the referenced point with the representative point taken as a reference, the third evaluation-function computation section 86 computes the value of the third horizontal-direction evaluation function F3 in accordance with Equation (18) which is given as follows.

$$F3=\{P(x)\geq Q(x+u)\&\&P(x)\leq Q(x+u-1)\}?1:0 \quad (18)$$

If the horizontal-direction waveform pattern is a rightward decreasing waveform pattern and the shorter-than-1-pixel shift sx is oriented in the minus direction, from a relation established between the representative point and the referenced point with the referenced point taken as a reference, the fourth evaluation-function computation section 87 computes the value of the fourth horizontal-direction evaluation function F4 in accordance with Equation (19) which is given as follows.

$$F4=\{Q(x+u) \geq P(x+1) \&\& Q(x+u) \leq P(x)\}?1:0 \qquad (19)$$

By replacing reference notation x with reference notation y and replacing reference notation u with reference notation v in Equation (16) used for computing the value of the first horizontal-direction evaluation function F1, Equation (17) used for computing the value of the second horizontal-direction evaluation function F2, Equation (18) used for computing the value of the third horizontal-direction evaluation function F3 and Equation (19) used for computing the value of the fourth horizontal-direction evaluation function F4, Equations (16), (17), (18) and (19) can be applied to computations of the values of the first vertical-direction evaluation function G1, the second vertical-direction evaluation function G2, the third vertical-direction evaluation function G3 and the fourth vertical-direction evaluation function G4 respectively in the case of a vertical-direction waveform pattern. Then, as overall correlation determination for a horizontal-direction waveform pattern, the overall determination section 88 computes the value of an overall horizontal-direction evaluation function F in accordance with Equation (13) and, as overall correlation determination for a vertical-direction waveform pattern, the overall determination section 88 computes the value of an overall vertical-direction evaluation function G in accordance with Equation (14). Eventually, as final correlation determination, the overall determination section 88 computes the value of a final evaluation function H in accordance with Equation (15) based on the value of the overall horizontal-direction evaluation function F and the value of the overall vertical-direction evaluation function G.

[Correlation Determination Processing for Downward-Protrusion Waveform Patterns]

Next, by referring to FIG. 13, the following description explains details of processing carried out to determine a correlation for a case in which the waveform pattern of three horizontal-direction adjacent pixels is a downward-protrusion waveform pattern. In this case, the middle one of the three horizontal-direction adjacent pixels is a representative point.

Much like FIG. 11, FIG. 13 is a plurality of explanatory diagrams to be referred to in description of a case in which the representative point and the referenced point are superposed on each other with precision determined by the integer-level resolution for a downward-protrusion waveform pattern.

If the horizontal-direction waveform pattern is a downward-protrusion waveform pattern, the shorter-than-1-pixel shift sx is oriented in the plus direction and a relation between the representative point and the referenced point is taken into consideration by taking the representative point as a reference, the pixel value P (x) of the representative point is not a pixel value between the pixel value of the referenced point on the referenced frame and the pixel value of a pixel adjacent to the referenced point. Thus, the first evaluation-function computation section 84 does not compute the value of the first horizontal-direction evaluation function F1.

If the horizontal-direction waveform pattern is a downward-protrusion waveform pattern, the shorter-than-1-pixel shift sx is oriented in the plus direction and a relation between the representative point and the referenced point is taken into consideration by taking the referenced point as a reference, on the other hand, from this relation, the second evaluation-function computation section 85 computes the value of the second horizontal-direction evaluation function F2 in accordance with Equation (20) which is given as follows.

$$F2=\{Q(x+u) \geq P(x) \&\& Q(x+u) \leq P(x+1)\}?1:0 \qquad (20)$$

If the horizontal-direction waveform pattern is a downward-protrusion waveform pattern, the shorter-than-1-pixel shift sx is oriented in the minus direction and a relation between the representative point and the referenced point is taken into consideration by taking the representative point as a reference, the pixel value P (x) of the representative point is not a pixel value between the pixel value of the referenced point on the referenced frame and the pixel value of a pixel adjacent to the referenced point. Thus, the third evaluation-function computation section 86 does not compute the value of the third horizontal-direction evaluation function F3.

If the horizontal-direction waveform pattern is a downward-protrusion waveform pattern, the shorter-than-1-pixel shift sx is oriented in the minus direction and a relation between the representative point and the referenced point is taken into consideration by taking the referenced point as a reference, on the other hand, from this relation, the fourth evaluation-function computation section 87 computes the value of the fourth horizontal-direction evaluation function F4 in accordance with Equation (21) which is given as follows.

$$F4=\{Q(x+u) \geq P(x) \&\& Q(x+u) \leq P(x-1)\}?1:0 \qquad (21)$$

By replacing reference notation x with reference notation y and replacing reference notation u with reference notation v in Equation (20) used for computing the value of the second horizontal-direction evaluation function F2 and Equation (21) used for computing the value of the fourth horizontal-direction evaluation function F4, Equations (20) and (21) can be applied to computations of the values of the second vertical-direction evaluation function G2 and the fourth vertical-direction evaluation function G4 respectively in the case of a vertical-direction waveform pattern. Then, as overall correlation determination for a horizontal-direction waveform pattern, the overall determination section 88 computes the value of an overall horizontal-direction evaluation function F in accordance with Equation (22) in place of Equation (13) and, as overall correlation determination for a vertical-direction waveform pattern, the overall determination section 88 computes the value of an overall vertical-direction evaluation function G in accordance with Equation (23) in place of Equation (14). Eventually, as final correlation determination, the overall determination section 88 computes the value of a final evaluation function H in accordance with Equation (15) based on the value of the overall horizontal-direction evaluation function F and the value of the overall vertical-direction evaluation function G.

$$F=\{(F2) \text{ or } (F4)\}?1:0 \qquad (22)$$

$$G=\{(G2) \text{ or } (G4)\}?1:0 \qquad (23)$$

In the computation of the value of the overall horizontal-direction evaluation function F, Equation (22) is used in place of Equation (14) whereas, in the computation of the value of the overall vertical-direction evaluation function G, Equation (23) is used in place of Equation (13) as described above for the following two reasons. The first reason is the fact that, if the horizontal-direction waveform pattern is a downward-protrusion waveform pattern, the first horizontal-direction evaluation function F1 and the third horizontal-direction evaluation function F3 do not exist whereas, by the same token, if the vertical-direction waveform pattern is a downward-protrusion waveform pattern, the first vertical-direction evaluation function G1 and the third vertical-direction evaluation function G3 do not exist. The second reason is the fact that, if the horizontal-direction waveform pattern is a downward-protrusion waveform pattern, there are cases in which both the condition for computing the value of the second horizontal-direction evaluation function F2 and the condition for computing the value of the fourth horizontal-direction evaluation function F4 are satisfied whereas, by the same token, if the vertical-direction waveform pattern is a downward-protrusion waveform pattern, there are cases in which both the condition for computing the value of the second vertical-direction evaluation function G2 and the condition for computing the value of the fourth vertical-direction evaluation function G4 are satisfied.

[Correlation Determination Processing for Upward-Protrusion Waveform Patterns]

Next, by referring to FIG. 14, the following description explains details of processing carried out to determine a correlation for a case in which the waveform pattern of three horizontal-direction adjacent pixels is an upward-protrusion waveform pattern. In this case, the middle one of the three horizontal-direction adjacent pixels is a representative point.

Much like FIG. 11, FIG. 14 is a plurality of explanatory diagrams to be referred to in description of a case in which the representative point and the referenced point are superposed on each other with precision determined by the integer-level resolution for an upward-protrusion waveform pattern.

If the horizontal-direction waveform pattern is an upward-protrusion waveform pattern, the shorter-than-1-pixel shift sx is oriented in the plus direction and a relation between the representative point and the referenced point is taken into consideration by taking the representative point as a reference, the pixel value P (x) of the representative point is not a pixel value between the pixel value of the referenced point on the referenced frame and the pixel value of a pixel adjacent to the referenced point. Thus, much like the case in which the horizontal-direction waveform pattern is a downward-protrusion waveform pattern, the first evaluation-function computation section 84 does not compute the value of the first horizontal-direction evaluation function F1.

If the horizontal-direction waveform pattern is an upward-protrusion waveform pattern, the shorter-than-1-pixel shift sx is oriented in the plus direction and a relation between the representative point and the referenced point is taken into consideration by taking the referenced point as a reference, on the other hand, from this relation, the second evaluation-function computation section 85 computes the value of the second horizontal-direction evaluation function F2 in accordance with Equation (24) which is given as follows.

$$F2=\{Q(x+u) \geq P(x+1) \&\& Q(x+u) \leq P(x)\}?1:0 \quad (24)$$

If the horizontal-direction waveform pattern is an upward-protrusion waveform pattern, the shorter-than-1-pixel shift sx is oriented in the minus direction and a relation between the representative point and the referenced point is taken into consideration by taking the representative point as a reference, the pixel value P (x) of the representative point is not a pixel value between the pixel value of the referenced point on the referenced frame and the pixel value of a pixel adjacent to the referenced point. Thus, the third evaluation-function computation section 86 does not compute the value of the third horizontal-direction evaluation function F3.

If the horizontal-direction waveform pattern is an upward-protrusion waveform pattern, the shorter-than-1-pixel shift sx is oriented in the minus direction and a relation between the representative point and the referenced point is taken into consideration by taking the referenced point as a reference, on the other hand, from this relation, the fourth evaluation-function computation section 87 computes the value of the fourth horizontal-direction evaluation function F4 in accordance with Equation (25) which is given as follows.

$$F4=\{Q(x+u) \geq P(x-1) \&\& Q(x+u) \leq P(x)\}?1:0 \quad (25)$$

By replacing reference notation x with reference notation y and replacing reference notation u with reference notation v in Equation (24) used for computing the value of the second horizontal-direction evaluation function F2 and Equation (25) used for computing the value of the fourth horizontal-direction evaluation function F4, Equations (24) and (25) can be applied to computations of the values of the second vertical-direction evaluation function G2 and the fourth vertical-direction evaluation function G4 respectively in the case of a vertical-direction waveform pattern. Then, as overall correlation determination for a horizontal-direction waveform pattern, the overall determination section 88 computes the value of an overall horizontal-direction evaluation function F in accordance with Equation (22) in place of Equation (13) and, as overall correlation determination for a vertical-direction waveform pattern, the overall determination section 88 computes the value of an overall vertical-direction evaluation function G in accordance with Equation (23) in place of Equation (14). Eventually, as final correlation determination, the overall determination section 88 computes the value of a final evaluation function H in accordance with Equation (15) based on the value of the overall horizontal-direction evaluation function F and the value of the overall vertical-direction evaluation function G.

FIG. 15 shows a table summarizing equations used by the first evaluation-function computation section 84, the second evaluation-function computation section 85, the third evaluation-function computation section 86 and the fourth evaluation-function computation section 87 to compute the values of the first horizontal-direction evaluation function F1, the second horizontal-direction evaluation function F2, the third horizontal-direction evaluation function F3 and the fourth horizontal-direction evaluation function F4 respectively in the case of horizontal-direction waveform patterns.

It is to be noted that the equations shown in FIG. 15 as equations provided for the first horizontal-direction evaluation function F1, the second horizontal-direction evaluation function F2, the third horizontal-direction evaluation function F3 and the fourth horizontal-direction evaluation function F4 are each an equation including a margin th which is set by taking noises of image data and the like into consideration.

As explained before, by replacing reference notation x with reference notation y and replacing reference notation u with reference notation v in the equations used to compute the values of the first horizontal-direction evaluation function F1, the second horizontal-direction evaluation function F2, the third horizontal-direction evaluation function F3 and the fourth horizontal-direction evaluation function F4, the equations can be applied to computations of the values of the first vertical-direction evaluation function G1, the second vertical-direction evaluation function G2, the third vertical-direction evaluation function G3 and the fourth vertical-direction evaluation function G4 respectively. Thus, a table of equations provided for the first vertical-direction evaluation function G1, the second vertical-direction evaluation function G2, the third vertical-direction evaluation function G3 and the fourth vertical-direction evaluation function G4 is shown in none of the figures.

As described above, the correlation determination section 64 evaluates a correlation in accordance with a result of determination as to whether or not a condition is satisfied. To be more specific, the correlation determination section 64 evaluates a correlation in accordance with a result of determination as to whether or not the pixel value of the representative point is between the pixel values of pixels adjacent to the referenced point, or whether or not the pixel value of the referenced point is between the pixel values of pixels adjacent to the representative point.

[Flow of Correlation Determination Processing]

Figure 16:
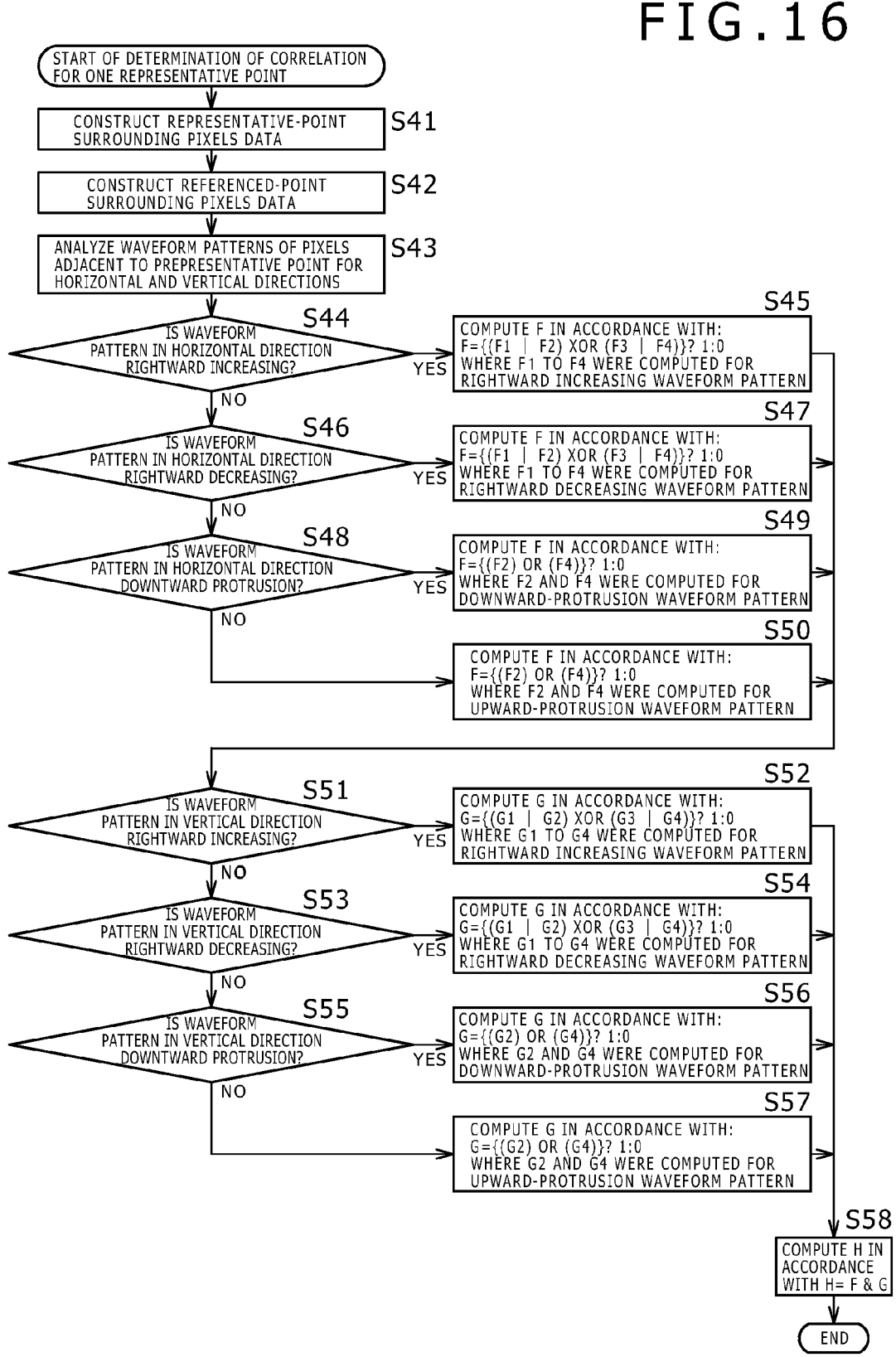
FIG. 16 shows an explanatory flowchart of correlation determination processing.

FIG. 16 shows an explanatory flowchart to be referred to in description of processing to determine a correlation. By referring to this flowchart, the following description explains the processing to determine a correlation for a representative point, information on which has been stored in the representative-point memory 61.

As shown in the figure, the flowchart begins with a step S41 at which the representative-point surrounding pixels data construction section 81 acquires information on a representative point from the representative-point memory 61 and constructs representative-point surrounding pixels data. The representative-point surrounding pixels data is defined as pixel data of the representative point on the reference frame and pixel data of pixels adjacent to the representative point.

Then, at the next step S42, the referenced-point surrounding pixels data construction section 82 constructs referenced-point surrounding pixels data which is defined as pixel data of the referenced point on the referenced frame and pixel data of pixels adjacent to the referenced point.

Subsequently, at the next step S43, the waveform-shape analysis section 83 analyzes waveform patterns of pixels adjacent to the representative point for horizontal and vertical directions. To put it in detail, the waveform-shape analysis section 83 analyzes the waveform pattern connecting the pixel values of three horizontal-direction adjacent pixels, the middle one of which is the representative point. By the same token, the waveform-shape analysis section 83 analyzes the waveform pattern connecting the pixel values of three vertical-direction adjacent pixels, the middle one of which is the representative point. Then, the waveform-shape analysis section 83 supplies the results of the analyses to the first evaluation-function computation section 84, the second evaluation-function computation section 85, the third evaluation-function computation section 86, the fourth evaluation-function computation section 87 and the overall determination section 88.

Subsequently, at the next step S44, each of the first evaluation-function computation section 84, the second evaluation-function computation section 85, the third evaluation-function computation section 86 and the fourth evaluation-function computation section 87 determines whether or not the horizontal-direction waveform pattern is rightward increasing. If each of the first evaluation-function computation section 84, the second evaluation-function computation section 85, the third evaluation-function computation section 86 and the fourth evaluation-function computation section 87 determines at the step S44 that the horizontal-direction waveform pattern is rightward increasing, the flow of the processing to determine a correlation goes on to a step S45. At the step S45, the first evaluation-function computation section 84, the second evaluation-function computation section 85, the third evaluation-function computation section 86 and the fourth evaluation-function computation section 87 compute the values of the first horizontal-direction evaluation function F1, the second horizontal-direction evaluation function F2, the third horizontal-direction evaluation function F3 and the fourth horizontal-direction evaluation function F4 respectively for the rightward increasing waveform pattern. To put it more concretely, the first evaluation-function computation section 84 computes the value of the first horizontal-direction evaluation function F1 in accordance with Equation (3), the second evaluation-function computation section 85 computes the value of the second horizontal-direction evaluation function F2 in accordance with Equation (4), the third evaluation-function computation section 86 computes the value of the third horizontal-direction evaluation function F3 in accordance with Equation (7) whereas the fourth evaluation-function computation section 87 computes the value of the fourth horizontal-direction evaluation function F4 in accordance with Equation (8). Then, the overall determination section 88 computes the value of the overall horizontal-direction evaluation function F in accordance with Equation (13) which is given as follows: $F=\{(F1|F2)xor(F3|F4)\}?1:0$.

If each of the first evaluation-function computation section 84, the second evaluation-function computation section 85, the third evaluation-function computation section 86 and the fourth evaluation-function computation section 87 determines at the step S44 that the horizontal-direction waveform pattern is not rightward increasing, on the other hand, the flow of the processing to determine a correlation goes on to a step S46. At the step S46, each of the first evaluation-function computation section 84, the second evaluation-function computation section 85, the third evaluation-function computation section 86 and the fourth evaluation-function computation section 87 determines whether or not the horizontal-direction waveform pattern is rightward decreasing. If each of the first evaluation-function computation section 84, the second evaluation-function computation section 85, the third evaluation-function computation section 86 and the fourth evaluation-function computation section 87 determines at the step S46 that the horizontal-direction waveform pattern is rightward decreasing, the flow of the processing to determine a correlation goes on to a step S47. At the step S47, the first evaluation-function computation section 84, the second evaluation-function computation section 85, the third evaluation-function computation section 86 and the fourth evaluation-function computation section 87 compute the values of the first horizontal-direction evaluation function F1, the second horizontal-direction evaluation function F2, the third horizontal-direction evaluation function F3 and the fourth horizontal-direction evaluation function F4 respectively for the rightward decreasing waveform pattern. To put it more concretely, the first evaluation-function computation section 84 computes the value of the first horizontal-direction evaluation function F1 in accordance with Equation (16), the second evaluation-function computation section 85 computes the value of the second horizontal-direction evaluation function F2 in accordance with Equation (17), the third evaluation-function computation section 86 computes the value of the third horizontal-direction evaluation function F3 in accordance with Equation (18) whereas the fourth evaluation-function computation section 87 computes the value of the fourth horizontal-direction evaluation function F4 in accordance with Equation (19). Then, the overall determination section 88 computes the value of the overall horizontal-direction evaluation function F in accordance with Equation (13) which is given as follows: $F=\{(F1|F2)xor(F3|F4)\}?1:0$.

If each of the first evaluation-function computation section 84, the second evaluation-function computation section 85, the third evaluation-function computation section 86 and the fourth evaluation-function computation section 87 determines at the step S46 that the horizontal-direction waveform pattern is not rightward decreasing, on the other hand, the flow of the processing to determine a correlation goes on to a step S48. At the step S48, each of the first evaluation-function computation section 84, the second evaluation-function computation section 85, the third evaluation-function computation section 86 and the fourth evaluation-function computation section 87 determines whether or not the horizontal-direction waveform pattern is a waveform pattern having a downward protrusion. If each of the first evaluation-function computation section 84, the second evaluation-function computation section 85, the third evaluation-function computation section 86 and the fourth evaluation-function computation section 87 determines at the step S48 that the horizontal-direction waveform pattern is a waveform pattern with a downward protrusion, the flow of the processing to determine a correlation goes on to a step S49. At the step S49, the second evaluation-function computation section 85 and the fourth evaluation-function computation section 87 compute the values of the second horizontal-direction evaluation function F2 and the fourth horizontal-direction evaluation function F4 respectively for the waveform pattern having a downward protrusion. To put it more concretely, the second evaluation-function computation section 85 computes the value of the second horizontal-direction evaluation function F2 in accordance with Equation (20) whereas the fourth evaluation-function computation section 87 computes the value of the fourth horizontal-direction evaluation function F4 in accordance with Equation (21). Then, the overall determination section 88 computes the value of the overall horizontal-direction evaluation function F in accordance with Equation (22) which is given as follows: F={(F2) or (F4)}?1:0.

If each of the first evaluation-function computation section 84, the second evaluation-function computation section 85, the third evaluation-function computation section 86 and the fourth evaluation-function computation section 87 determines at the step S48 that the horizontal-direction waveform pattern is not a waveform pattern with a downward protrusion, that is, if each of the first evaluation-function computation section 84, the second evaluation-function computation section 85, the third evaluation-function computation section 86 and the fourth evaluation-function computation section 87 determines at the step S48 that the horizontal-direction waveform pattern is a waveform pattern with an upward protrusion, on the other hand, the flow of the processing to determine a correlation goes on to a step S50. At the step S50, the second evaluation-function computation section 85 and the fourth evaluation-function computation section 87 compute the values of the second horizontal-direction evaluation function F2 and the fourth horizontal-direction evaluation function F4 respectively for the waveform pattern having an upward protrusion. To put it more concretely, the second evaluation-function computation section 85 computes the value of the second horizontal-direction evaluation function F2 in accordance with Equation (24) whereas the fourth evaluation-function computation section 87 computes the value of the fourth horizontal-direction evaluation function F4 in accordance with Equation (25). Then, the overall determination section 88 computes the value of the overall horizontal-direction evaluation function F in accordance with Equation (22) which is given as follows: F={(F2) or (F4)}?1:0.

After the process carried out at the step S45, S47, S49 or S50 has been completed, the flow of the processing to determine a correlation goes on to a step S51. At the step S51, each of the first evaluation-function computation section 84, the second evaluation-function computation section 85, the third evaluation-function computation section 86 and the fourth evaluation-function computation section 87 determines whether or not the vertical-direction waveform pattern is rightward increasing. If each of the first evaluation-function computation section 84, the second evaluation-function computation section 85, the third evaluation-function computation section 86 and the fourth evaluation-function computation section 87 determines at the step S51 that the vertical-direction waveform pattern is rightward increasing, the flow of the processing to determine a correlation goes on to a step S52. At the step S52, the first evaluation-function computation section 84, the second evaluation-function computation section 85, the third evaluation-function computation section 86 and the fourth evaluation-function computation section 87 compute the values of the first vertical-direction evaluation function G1, the second vertical-direction evaluation function G2, the third vertical-direction evaluation function G3 and the fourth vertical-direction evaluation function G4 respectively for the rightward increasing waveform pattern. Then, the overall determination section 88 computes the value of the overall vertical-direction evaluation function G in accordance with Equation (14) which is given as follows: G={(G1|G2)xor(G3|G4)}?1:0.

If each of the first evaluation-function computation section 84, the second evaluation-function computation section 85, the third evaluation-function computation section 86 and the fourth evaluation-function computation section 87 determines at the step S51 that the vertical-direction waveform pattern is not rightward increasing, on the other hand, the flow of the processing to determine a correlation goes on to a step S53. At the step S53, each of the first evaluation-function computation section 84, the second evaluation-function computation section 85, the third evaluation-function computation section 86 and the fourth evaluation-function computation section 87 determines whether or not the vertical-direction waveform pattern is rightward decreasing. If each of the first evaluation-function computation section 84, the second evaluation-function computation section 85, the third evaluation-function computation section 86 and the fourth evaluation-function computation section 87 determines at the step S53 that the vertical-direction waveform pattern is rightward decreasing, the flow of the processing to determine a correlation goes on to a step S54. At the step S54, the first evaluation-function computation section 84, the second evaluation-function computation section 85, the third evaluation-function computation section 86 and the fourth evaluation-function computation section 87 compute the values of the first vertical-direction evaluation function G1, the second vertical-direction evaluation function G2, the third vertical-direction evaluation function G3 and the fourth vertical-direction evaluation function G4 respectively for the rightward decreasing waveform pattern. Then, the overall determination section 88 computes the value of the overall vertical-direction evaluation function G in accordance with Equation (14) which is given as follows: G={(G1|G2)xor(G3|G4)}?1:0.

If each of the first evaluation-function computation section 84, the second evaluation-function computation section 85, the third evaluation-function computation section 86 and the fourth evaluation-function computation section 87 determines at the step S53 that the vertical-direction waveform pattern is not rightward decreasing, on the other hand, the flow of the processing to determine a correlation goes on to a step S55. At the step S55, each of the first evaluation-function computation section 84, the second evaluation-function computation section 85, the third evaluation-function computation section 86 and the fourth evaluation-function computation section 87 determines whether or not the vertical-direction waveform pattern is a waveform pattern having a downward protrusion. If each of the first evaluation-function computation section 84, the second evaluation-function computation section 85, the third evaluation-function computation section 86 and the fourth evaluation-function computation section 87 determines at the step S55 that the vertical-direction waveform pattern is a waveform pattern with a downward protrusion, the flow of the processing to determine a correlation goes on to a step S56. At the step S56, the second evaluation-function computation section 85 and the fourth evaluation-function computation section 87 compute the values of the second vertical-direction evaluation function G2 and the fourth vertical-direction evaluation function G4 respectively for the waveform pattern having a downward protrusion. Then, the overall determination section 88 computes the value of the overall vertical-direction evaluation function G in accordance with Equation (23) which is given as follows: G={(G2) or (G4)}?1:0.

If each of the first evaluation-function computation section 84, the second evaluation-function computation section 85, the third evaluation-function computation section 86 and the fourth evaluation-function computation section 87 determines at the step S55 that the vertical-direction waveform pattern is not a waveform pattern with a downward protrusion, that is, if each of the first evaluation-function computation section 84, the second evaluation-function computation section 85, the third evaluation-function computation section 86 and the fourth evaluation-function computation section 87 determines at the step S55 that the vertical-direction waveform pattern is a waveform pattern with an upward protrusion, on the other hand, the flow of the processing to determine a correlation goes on to a step S57. At the step S57, the second evaluation-function computation section 85 and the fourth evaluation-function computation section 87 compute the values of the second vertical-direction evaluation function G2 and the fourth vertical-direction evaluation function G4 respectively for the waveform pattern having an upward protrusion. Then, the overall determination section 88 computes the value of the overall vertical-direction evaluation function G in accordance with Equation (23) which is given as follows: G={(G2) or (G4)}?1:0.

As explained above, in the case of a horizontal-direction wave pattern with a downward protrusion or an upward protrusion, the first evaluation-function computation section 84 does not compute the value of the first horizontal-direction evaluation function F1 whereas the third evaluation-function computation section 86 does not compute the value of the third horizontal-direction evaluation function F3. It is to be noted, however, that the first evaluation-function computation section 84 and the third evaluation-function computation section 86 may also compute the values of dummy functions F1 and F3 respectively provided that the results of the computations are F1=0 and F3=0 respectively.

After the process carried out at the step S52, S54, S56 or S57 has been completed, the flow of the processing to determine a correlation goes on to a step S58. At the step S58, the overall determination section 88 finally computes the value of the final evaluation function H in accordance with Equation (15) which is given as follows H=F & G. The final evaluation function H having a value of "1" obtained as a result of the computation indicates that the correlation between the representative point and the referenced point is high whereas the final evaluation function H having a value of "0" obtained as a result of the computation indicates that the correlation between the representative point and the referenced point is low.

At the step S26 in FIG. 8, the correlation determination processing in FIG. 16 is carried out for each representative point, the information on which has been stored in the representative-point memory 61.

For a representative point existing at a location having a large spatial gradient, the inter-frame pixel-value difference dt of even adjacent pixels separated from each other by a pixel shift shorter than the shift-direction size of one pixel may be extremely large in some cases. A typical example of the location having a large spatial gradient is the location of an edge portion. Thus, it is difficult to evaluate the correlation between the representative point and the referenced point in correlation determination processing by making use of a threshold value which has been determined in advance.

The correlation determination processing carried out by the image processing apparatus 1 is adaptive correlation determination processing based on representative-point surrounding pixels data of the representative point and pixels adjacent to the representative point and based on referenced-point surrounding pixels data of the referenced point and pixels adjacent to the referenced point. That is to say, the correlation determination section 64 employed in the image processing apparatus 1 evaluates a correlation in accordance with a result of determination as to whether or not a condition is satisfied. To be more specific, the correlation determination section 64 evaluates a correlation in accordance with a result of determination as to whether or not the pixel value of the representative point is between the pixel values of pixels adjacent to the referenced point, or whether or not the pixel value of the referenced point is between the pixel values of pixels adjacent to the representative point. Thus, the correlation determination section 64 is capable of carrying out the correlation determination processing with a high degree of precision.

Then, on the basis of a result of the correlation determination processing which has been carried out with a high degree of precision for a specific representative point selected from representative points whose information has been stored in the representative-point memory 61, information on the selected specific representative point is updated, if necessary, in order to delete the information on the selected specific representative point from the representative-point memory 61. Subsequently, an evaluation-value table is generated again for a representative point remaining in the representative-point memory 61 after the information on the specific representative point has been updated so that the evaluation-value table generated after the information on the representative point has been updated is also reliable.

Thus, a vector can be detected with a high degree of precision.

[Candidate-Vector Assignment Processing of the Candidate-Vector Assignment Section]

Next, candidate-vector assignment processing carried out by the candidate-vector assignment section 14 is explained. This candidate-vector assignment processing corresponds to the process carried out at the step S3 in FIG. 2.

Figure 17:
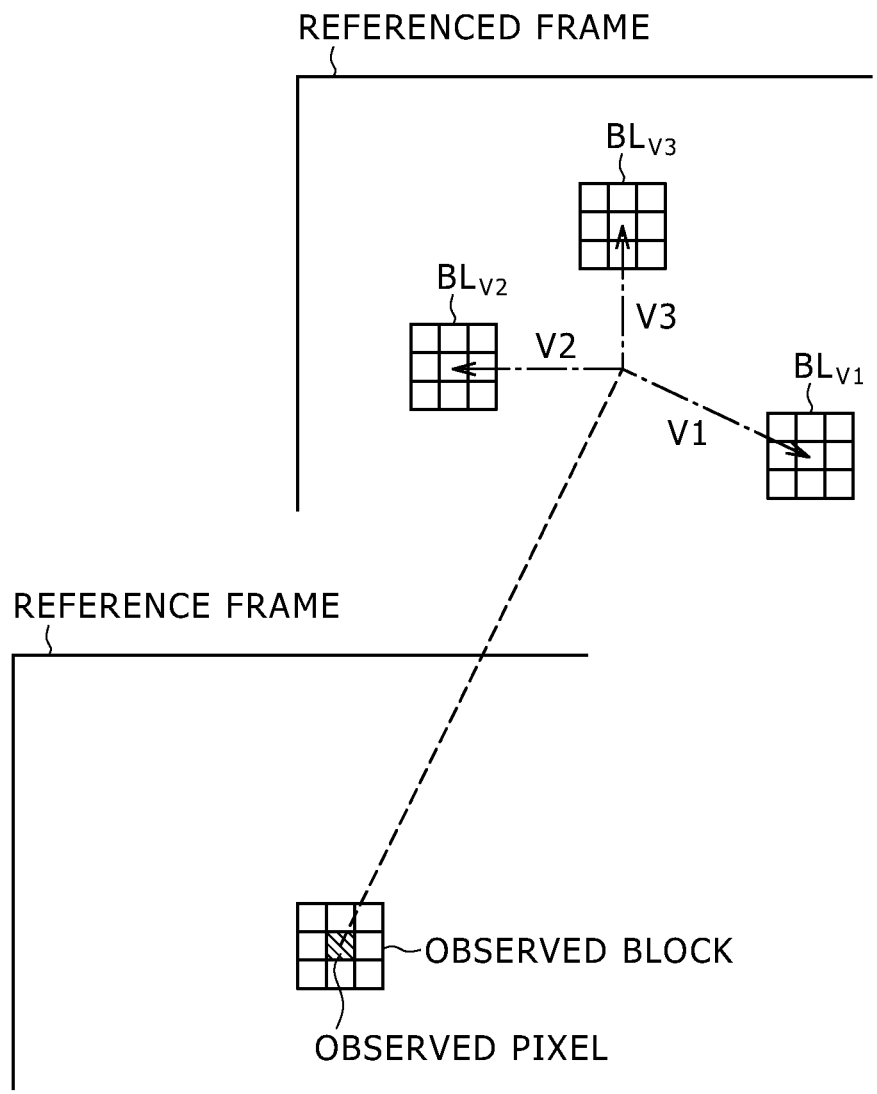
FIG. 17 is a conceptual diagram of candidate-vector assignment processing.

FIG. 17 is a conceptual diagram to be referred to in explanation of the concept of the candidate-vector assignment processing carried out by the candidate-vector assignment section 14.

Three candidate vectors V1, V2 and V3 shown in FIG. 17 are typical candidate vectors supplied by the control section 13 to the candidate-vector assignment section 14 to serve as candidate vectors for a representative point on the reference frame.

The candidate-vector assignment section 14 identifies a certain pixel at the representative point on the reference frame as an observed pixel. The observed is a pixel to be observed as a pixel for which a motion vector is to be decided. The candidate-vector assignment section 14 then constructs an observed block having a size determined in advance. The center of the observed block coincides with the observed pixel. A typical observed block shown in FIG. 17 has a horizontal-direction size of three pixels and a vertical-direction size of three pixels. A hatched pixel shown in FIG. 17 is the observed pixel which is the pixel at the center of the typical observed block.

Then, for each of the candidate vectors V1, V2 and V3, the candidate-vector assignment section 14 sets an examined block on the referenced frame. Each of the examined blocks is associated with the observed block. The examined blocks each have the same size as the observed block.

As shown in FIG. 17, examined blocks $BL_{v1}$, $BL_{v2}$ and $BL_{v3}$ have been constructed for the candidate vectors V1, V2 and V3 respectively.

The candidate-vector assignment section 14 carries out a block matching process on the observed block and each of the examined blocks $BL_{v1}$, $BL_{v2}$ and $BL_{v3}$. The candidate-vector assignment section 14 carries out the block matching process in order to select one of the examined blocks $BL_{v1}$, $BL_{v2}$ and $BL_{v3}$. The selected examined block is an examined block set for a specific one of the candidate vectors V1, V2 and V3 received from the control section 13. The specific candidate vector is a candidate vector which is optimum for the observed pixel. Then, the candidate-vector assignment section 14 decides the optimum candidate vector as the motion vector of the observed block and outputs the motion vector as the output of the image processing apparatus 1.

Figure 18:
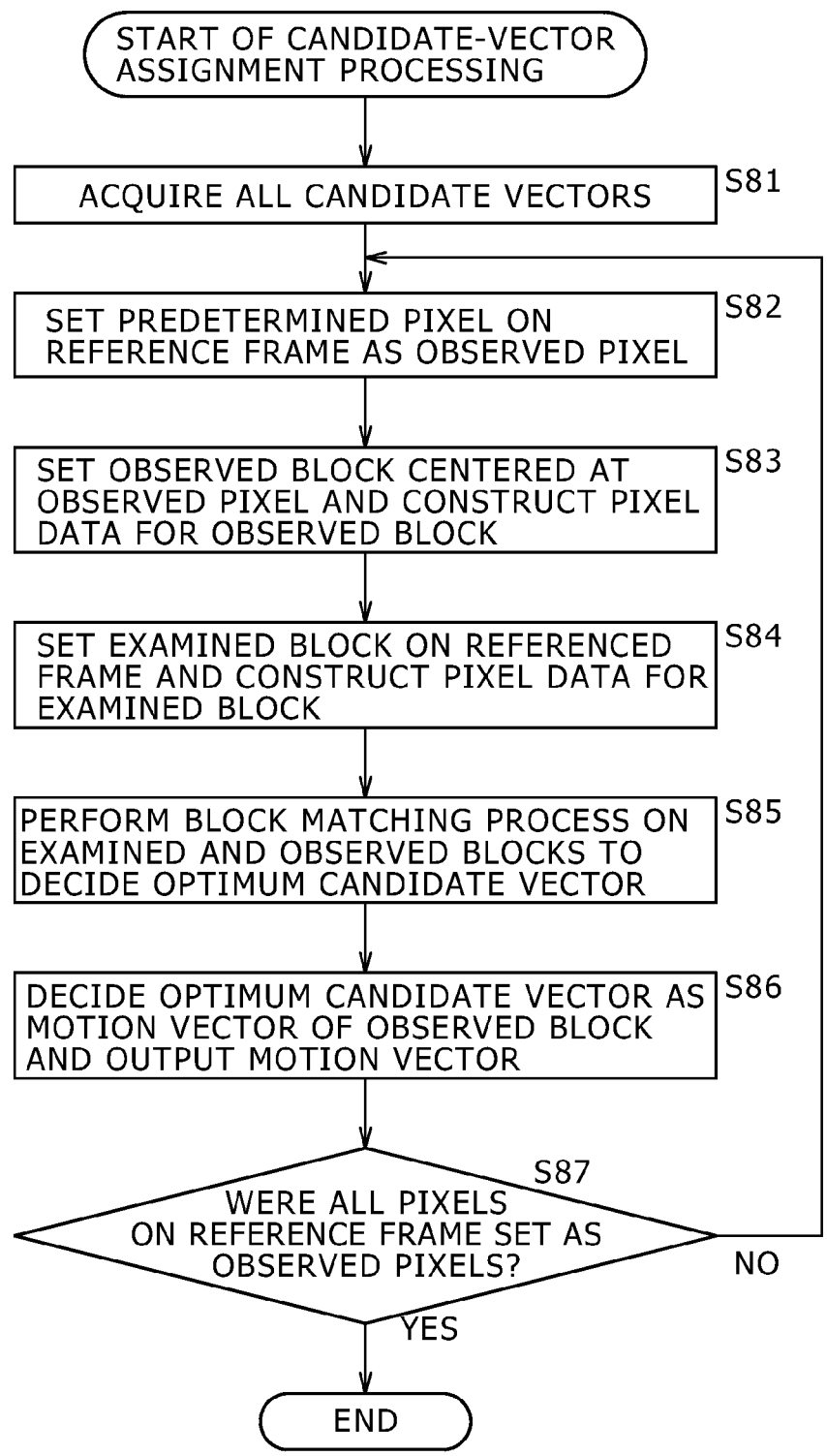
FIG. 18 shows an explanatory flowchart of candidate-vector assignment processing.

FIG. 18 shows an explanatory flowchart to be referred to in description of the candidate-vector assignment processing which is carried out by the candidate-vector assignment section 14.

As shown in the figure, the flowchart representing the candidate-vector assignment processing begins with a step S81 at which the candidate-vector assignment section 14 acquires all candidate vectors for a representative point from the control section 13.

Then, at the next step S82, the candidate-vector assignment section 14 sets a predetermined pixel at the representative point on the reference frame as an observed pixel.

Subsequently, at the next step S83, the candidate-vector assignment section 14 sets an observed block on the reference frame. The observed block has a center coinciding with the observed pixel and has a size determined in advance. In addition, the candidate-vector assignment section 14 also constructs pixel data for the observed block.

Then, at the next step S84, for each of the candidate vectors received from the control section 13, the candidate-vector assignment section 14 sets an examined block on the referenced frame to serve as a block associated with the observed block and constructs pixel data for each of the examined blocks.

Subsequently, at the next step S85, the candidate-vector assignment section 14 carries out a block matching process on each of the examined blocks and the observed blocks in order to select one of the examined blocks. The selected examined block is an examined block set for a specific one of the candidate vectors received from the control section 13. The specific candidate vector is a candidate vector which is optimum for the observed pixel.

In the block matching process, typically, the candidate-vector assignment section 14 calculates the absolute value of a difference in pixel value between each observed-block pixel and an examined-block pixel corresponding to the observed-block pixel. In this case, an observed-block pixel means a pixel in the observed block whereas an examined-block pixel means a pixel in an examined block. The candidate-vector assignment section 14 then calculates the sum of the absolute values for every examined block and takes each of the calculated sums as an evaluation value. Finally, the candidate-vector assignment section 14 decides the candidate vector pointing to an examined block having the smallest computed evaluation value as a candidate vector which is optimum for the observed pixel at the center of the observed block.

Then, at the next step S86, the candidate-vector assignment section 14 decides the optimum candidate vector as the motion vector of the observed block and outputs the motion vector as the output of the image processing apparatus 1.

Subsequently, at the next step S87, the candidate-vector assignment section 14 determines whether or not every pixel on the reference frame has been set as an observed pixel. If the candidate-vector assignment section 14 determines at the step S87 that not every pixel on the reference frame has been set as an observed pixel, the flow of the candidate-vector assignment processing goes back to the step S82. At the step S82, the candidate-vector assignment section 14 sets another pixel on the reference frame as a next observed pixel. The other pixel is a pixel not set yet so far as an observed pixel. Then, the candidate-vector assignment section 14 again carries out the processes of the steps following the step S82.

If the candidate-vector assignment section 14 determines at the step S87 that every pixel on the reference frame has been set as an observed pixel, on the other hand, the flow of the candidate-vector assignment processing is terminated.

As described above, for every pixel on the reference frame, the candidate-vector assignment section 14 selects a candidate vector from a plurality of candidate vectors received from the control section 13 for the pixel. The candidate-vector assignment section 14 decides the selected candidate vector as the motion vector of the pixel and outputs the motion vector as the output of the image processing apparatus 1.

As described above, in the candidate-vector assignment processing in FIG. 18, the candidate-vector assignment section 14 takes every pixel on the reference frame as an observed pixel in order to determine a motion vector for the pixel. In this way, the candidate-vector assignment section 14 determines a motion vector for every pixel on the reference frame. It is to be noted, however, that the candidate-vector assignment section 14 can also divide the reference frame into a plurality of blocks and determine a motion vector for each of the blocks.

In addition, in the candidate-vector assignment processing in FIG. 18, the candidate-vector assignment section 14 calculates the absolute value of a difference in pixel value between each observed-block pixel and an examined-block pixel corresponding to the observed-block pixel. In this case, an observed-block pixel means a pixel on the observed block whereas an examined-block pixel means a pixel on an examined block. The candidate-vector assignment section 14 then calculates the sum of the absolute values for every examined block and takes each of the calculated sums as an evaluation value of the block matching process. However, as an evaluation value, a computation result of another computation process can also be taken. For example, in the other computation process, the candidate-vector assignment section 14 calculates the square of a difference in pixel value between each observed-block pixel and an examined-block pixel corresponding to the observed-block pixel. The candidate-vector assignment section 14 then calculates the sum of the squares for every examined block and takes each of the computed sums as an evaluation value. As another example, as an evaluation value, a normalized mutual correlation is used. In this case, the candidate-vector assignment section 14 takes a candidate vector pointing to an examined block having the largest computed evaluation value as a candidate vector which is optimum for the observed pixel.

As explained earlier, every series of processes described previously can be carried out by hardware and/or execution of software. If the series of processes described above is carried out by execution of software, programs composing the software can be installed into a computer embedded in dedicated hardware, a general-purpose personal computer or the like typically from a program provider connected to a network or from a removable recording medium. In this case, the computer or the general-purpose personal computer serves as the image processing apparatus 1 described above. A general-purpose personal computer is a personal computer which can be made capable of carrying out a variety of functions by installing a variety of programs into the personal computer. In the following description, both the computer and the general-purpose personal computer are referred to as a computer which is used as a generic technical term for the computer and the personal computer.

Figure 19:
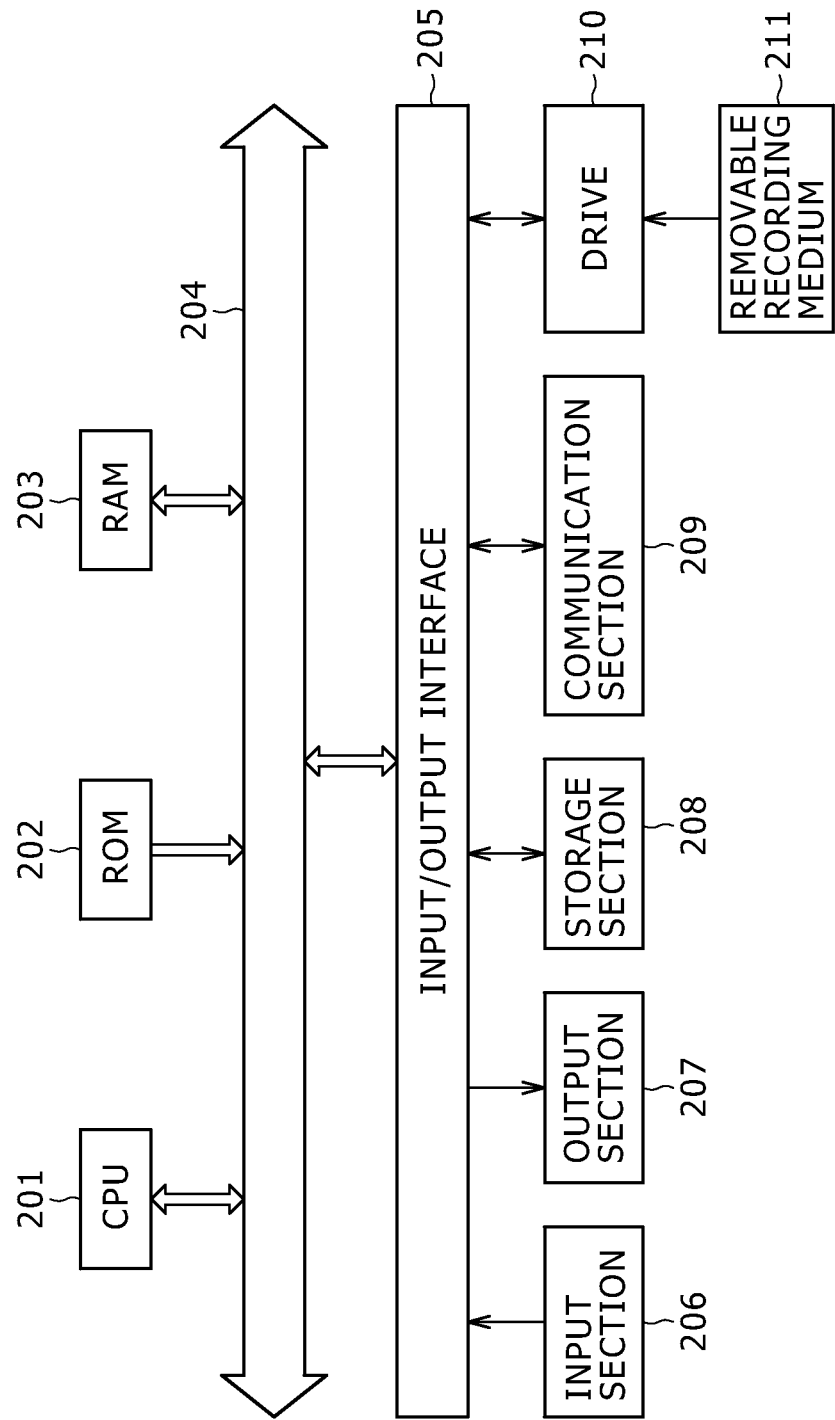
FIG. 19 is a block diagram showing a typical configuration of an embodiment implementing a computer functioning as the image processing apparatus to which the present invention is applied.

FIG. 19 is a block diagram showing a typical configuration of hardware implementing the computer for executing the each of the programs in order to carry out every series of processes.

As shown in the block diagram, the computer is configured to include a CPU (Central Processing Unit) 201, a ROM (Read Only Memory) 202 and RAM (Random Access Memory) 203 which are connected to each other by a bus 204.

The bus 204 is also connected to an input/output interface 205. The input/output interface 205 is connected to an input section 206, an output section 207, a storage section 208, a communication section 209 and a drive 210.

The input section 206 includes a keyboard, a mouse and a microphone whereas the output section 207 includes a display unit and a speaker. The storage section 208 includes a hard disk and/or a nonvolatile memory. The communication section 209 is a network interface or the like. The drive 320 is a section for driving a removable recording medium 211 mounted thereon. The removable recording medium 211 can be a magnetic disk, an optical disk, a magneto-optical disk or a semiconductor memory.

The CPU 201 employed in the computer having the configuration described above executes each of the programs in order to carry out every series of processes described above. The programs have been stored typically in the storage section 208. Before being executed by the CPU 201, the programs are loaded into the RAM 203 by way of the input/output interface 205 and the bus 204.

The programs to be executed by the CPU 201 employed in the computer are presented to the user by recording the programs on the removable recording medium 211 which is then given to the user as a package recording medium. As an alternative, the programs can be presented to the user by downloading the programs from the program provider cited above to the storage section 208 through a transmission medium, the communication section 209 and the input/output interface 205. The transmission medium can be the wire-communication medium such as a local area network or the Internet or can be the radio-communication medium such as a digital broadcasting satellite.

If the programs are presented to the user by recording the programs on the removable recording medium 211, the removable recording medium 211 is mounted on the drive 210 employed in the computer. The programs are then installed in the storage section 208 from the removable recording medium 211 by way of the drive 210 and the input/output interface 205. In addition, as described above, the programs can be presented to the user by downloading the programs from a program provider to the storage section 208 through a transmission medium, which can be the wire-communication medium or the radio-communication medium, the communication section 209 and the input/output interface 205. As another alternative, the programs can be stored in the ROM 202 and/or the storage section 208 in advance.

It is to be noted that a program to be executed by the CPU 201 employed in the computer can be a program including steps to be executed in order to carry out processing in accordance with a sequence represented by a flowchart, which is explained in this specification, along the time axis. As an alternative, a program to be executed by the CPU 201 employed in the computer can be one of programs which are to be executed concurrently or individually in accordance with typically program invocation with a required timing.

Implementations of the present invention are by no means limited to the embodiment described above. That is to say, the embodiment can be changed to a variety of modified versions within a range which does not deviate from essentials of the present invention.

The present application contains subject matter related to that disclosed in Japanese Priority Patent Application JP 2010-003077 filed with the Japan Patent Office on Jan. 8, 2010, the entire content of which is hereby incorporated by reference.

What is claimed is:

1. An image processing apparatus, comprising:
representative-point storing means for functioning as storage means used for storing a plurality of pixels each existing on a reference image to serve as a representative point for which a motion vector is to be detected in an operation to detect a motion vector for said representative point representing pixels on said reference image by comparing said reference image with a referenced image;
evaluation-value table generation means for generating an evaluation-value table by adoption of a representative-point matching technique making use of said representative points stored in said representative-point storing means;
peak detection means for detecting a position corresponding to a maximum value of evaluation-value sums stored in said evaluation-value table as a candidate vector serving as a candidate for said motion vector; and
correlation determination means for determining a correlation between said representative point on said reference image and a point existing at the end of said candidate vector detected for said representative point to serve as a referenced point at which a pixel is located on said referenced image for each of a plurality of said representative points stored in said representative-point storing means and deleting a representative point having a high correlation from said representative-point storing means in order to update said representative-point storing means, wherein
an operation carried out by said evaluation-value table generation means to generate said evaluation-value table on the basis of representative points stored in said representative-point storing means,
an operation carried out by said peak detection means to detect said candidate vector,
an operation carried out by said correlation determination means to determine said correlation between said representative point and said referenced point as well as an operation carried out by said correlation determination means to update said representative-point storing means in accordance with a result of said operation to determine a correlation between said representative point and said referenced point are repeated as long as existence of a significant candidate vector is determined.

2. The image processing apparatus according to claim 1, further comprising control means for controlling repetition of said operation to generate said evaluation-value table, said operation to detect said candidate vector, said operation to determine said correlation between said representative point and said referenced point as well as said operation to update said representative-point storing means, wherein said control means stops said repetition in accordance with said maximum value of evaluation-value sums stored in said evaluation-value table.

3. The image processing apparatus according to claim 2, wherein said correlation determination means determines said correlation between said representative point and said referenced point by comparing representative-point surrounding pixels data of said representative point and pixels adjacent to said representative point with referenced-point surrounding pixels data of said referenced point and pixels adjacent to said referenced point.

4. The image processing apparatus according to claim 3, wherein said correlation determination means determines said correlation between said representative point and said referenced point by determining whether or not:

a condition requiring that the pixel value of said representative point be between the pixel value of said referenced point and the pixel value of a pixel adjacent to said referenced point is satisfied; or a condition requiring that the pixel value of said referenced point be between the pixel value of said representative point and the pixel value of a pixel adjacent to said representative point is satisfied.

5. The image processing apparatus according to claim 4, wherein said correlation determination means analyzes the shape of a waveform pattern connecting the pixel value of said representative point and the pixel values of pixels adjacent to said representative point to each other in order to determine whether said waveform pattern has a rightward increasing shape, a rightward decreasing shape, an upward-protrusion shape or a downward-protrusion shape; and determines said correlation between said representative point and said referenced point in a correlation determination process which varies in accordance with the shape of said waveform pattern.

6. The image processing apparatus according to claim 1, further comprising control means for controlling repetition of said operation to generate said evaluation-value table, said operation to detect said candidate vector, said operation to determine said correlation between said representative point and said referenced point as well as said operation to update said representative-point storing means, wherein said control means stops said repetition in accordance with the number of updated representative points stored in said representative-point storing means.

7. The image processing apparatus according to claim 1, further comprising representative-point selection means for:

deciding said representative point from pixels on said reference frame by determining whether or not the pixel value of said representative point is different from the pixel values of pixels adjacent to said representative point; and storing said selected representative point in said representative-point storing means.

* * * * *